United States Patent
Miyasaka et al.

(10) Patent No.: US 7,708,108 B2
(45) Date of Patent: May 4, 2010

(54) VEHICLE STEERING CONTROL APPARATUS AND METHOD

(75) Inventors: Shogo Miyasaka, Ebina (JP); Noriki Kubokawa, Zama (JP); Takaaki Eguchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 373 days.

(21) Appl. No.: 11/702,597

(22) Filed: Feb. 6, 2007

(65) Prior Publication Data

US 2007/0205040 A1  Sep. 6, 2007

(30) Foreign Application Priority Data

Mar. 1, 2006  (JP) .............................. 2006-054319

(51) Int. Cl.
  *B52D 5/00* (2006.01)
(52) U.S. Cl. ...................................... 180/402; 180/405
(58) Field of Classification Search ................. 180/444, 180/197, 402, 446, 405; 701/41; 192/30 W, 192/109 F
  See application file for complete search history.

(56) References Cited

U.S. PATENT DOCUMENTS

| | | | |
|---|---|---|---|
| 4,913,249 A | | 4/1990 | Lang |
| 5,097,918 A * | | 3/1992 | Daido et al. ................. 180/446 |
| 5,732,791 A * | | 3/1998 | Pinkos et al. ................ 180/444 |
| 6,039,673 A * | | 3/2000 | Mikami et al. ................ 477/93 |
| 6,220,385 B1 * | | 4/2001 | Bohner et al. ............... 180/403 |
| 6,442,462 B1 * | | 8/2002 | Nishizaki et al. .............. 701/41 |
| 6,580,989 B1 * | | 6/2003 | Husain et al. .................. 701/41 |
| 6,842,678 B2 * | | 1/2005 | Husain et al. .................. 701/41 |
| 7,322,439 B2 * | | 1/2008 | Hara et al. ................... 180/402 |
| 7,448,464 B2 * | | 11/2008 | Yamasaki et al. ............ 180/402 |
| 2005/0082108 A1 | | 4/2005 | Husain |
| 2006/0200289 A1 * | | 9/2006 | Chino et al. ................... 701/41 |
| 2007/0144815 A1 * | | 6/2007 | Tsutsumi et al. ............. 180/402 |
| 2007/0144816 A1 * | | 6/2007 | Wun et al. ................... 180/402 |
| 2007/0215405 A1 * | | 9/2007 | Tsutsumi et al. ............. 180/402 |
| 2007/0275810 A1 * | | 11/2007 | Sinojima et al. ............. 475/216 |
| 2008/0156572 A1 * | | 7/2008 | Kasahara et al. ............. 180/402 |
| 2008/0185213 A1 * | | 8/2008 | Mori et al. ................... 180/402 |

FOREIGN PATENT DOCUMENTS

| | | |
|---|---|---|
| DE | 37 23 205 A1 | 1/1988 |
| DE | 40 42 196 A1 | 7/1992 |
| EP | 1205371 A2 * | 5/2002 |
| EP | 1829766 A1 * | 9/2007 |
| JP | 2002-225733 | 8/2002 |

* cited by examiner

*Primary Examiner*—Tony H. Winner
(74) *Attorney, Agent, or Firm*—Global IP Counselors, LLP

(57) ABSTRACT

A vehicle steering control apparatus has a steering wheel, a steering mechanism mechanically separate from the steering wheel for steering the left and right front wheels and a reaction force motor for imparting an operation reaction force against the steering wheel. A steering motor is provided to impart a turning force to the steering mechanism, while a clutch is provided to mechanically connect and disconnect the steering wheel to and from the steering mechanism. A drive torque detector is provided to detect a drive torque imparted to the steering reaction force actuator. A torque sensor is provided to detect an operating torque imparted to the steering wheel. A clutch connection determiner determines that the clutch is in a connected state when a drive torque direction detected by the drive torque detector and an operating torque direction detected by the operating torque detector are different.

14 Claims, 14 Drawing Sheets

VEHICLE STEERING CONTROL APPARATUS AND METHOD

CROSS-REFERENCE TO RELATED APPLICATIONS

This application claims priority to Japanese Patent Application No. 2006-054319 filed on Mar. 1, 2006. The entire disclosure of Japanese Patent Application No. 2006-054319 is hereby incorporated herein by reference.

BACKGROUND OF THE INVENTION

1. Field of the Invention

The present invention generally relates to a vehicle steering control apparatus including a steer-by-wire system and a clutch for mechanically connecting and disconnecting a driver operating unit to and from a steering unit configured to steer a steered wheel.

2. Background Information

In conventional steer-by-wire (SBW) systems in which the steering wheel and the steering mechanism of the front wheels are mechanically separated from each other (e.g., Japanese Laid-Open Patent Publication No. 2002-225733), a clutch is provided as a backup mechanism for mechanically connecting the steering wheel and the steering mechanism together. When an abnormality occurs in a portion of the SBW system, the clutch is connected and the SBW control is suspended immediately and replaced with an assist control that reduces the steering burden of the driver.

In view of the above, it will be apparent to those skilled in the art from this disclosure that there exists a need for an improved vehicle steering control apparatus. This invention addresses this need in the art as well as other needs, which will become apparent to those skilled in the art from this disclosure.

SUMMARY OF THE INVENTION

With the conventional technology just described, when the SBW control is continued while the clutch is connected, the steering control causes a steering torque to be exerted such that an actual (detected) steering angle is matched to a command steering angle. Since the driver operating unit and the steering unit are connected, the steering wheel also turns as a result of the steering control and the difference between the actual (detected) steering angle and the command steering angle does not decrease. Consequently, the steering torque increases and the driver experiences an odd feeling with respect to operation of the steering wheel.

The present invention was conceived in view of the problem just described. One object is to provide a vehicle steering control apparatus that enables a driver to continue operating the steering wheel even when the SBW control continues to apply a steering torque at the steering unit. The invention accomplishes this object by appropriately determining when the clutch is connected.

In order to achieve the aforementioned object, a vehicle steering control apparatus in accordance with the present invention comprises a driver operating unit, a steering unit, a steering reaction force actuator, a steering actuator, a clutch, an operating torque detector, and a clutch connection determiner. The driver operating unit is configured to be operated by a driver. The steering unit is arranged to be mechanically separated from the driver operating unit and configured to turn at least one steered wheel. The steering reaction force actuator is operable to apply an operating reaction force to the driver operating unit. The steering actuator is configured to apply a turning force to the steering unit. The clutch is operable to mechanically connect and disconnect the driver operating unit and the steering unit to and from each other. The drive torque detector is operable to detect a drive torque imparted to the steering reaction force actuator. The operating torque detector is operable to detect an operating torque applied to the driver operating unit. The clutch connection determiner is configured to determine that the clutch is in a connected state when a drive torque direction indicated by a drive torque detection value detected by the drive torque detector and an operating torque direction indicated by an operating torque detection value detected by the operating torque detector are different.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
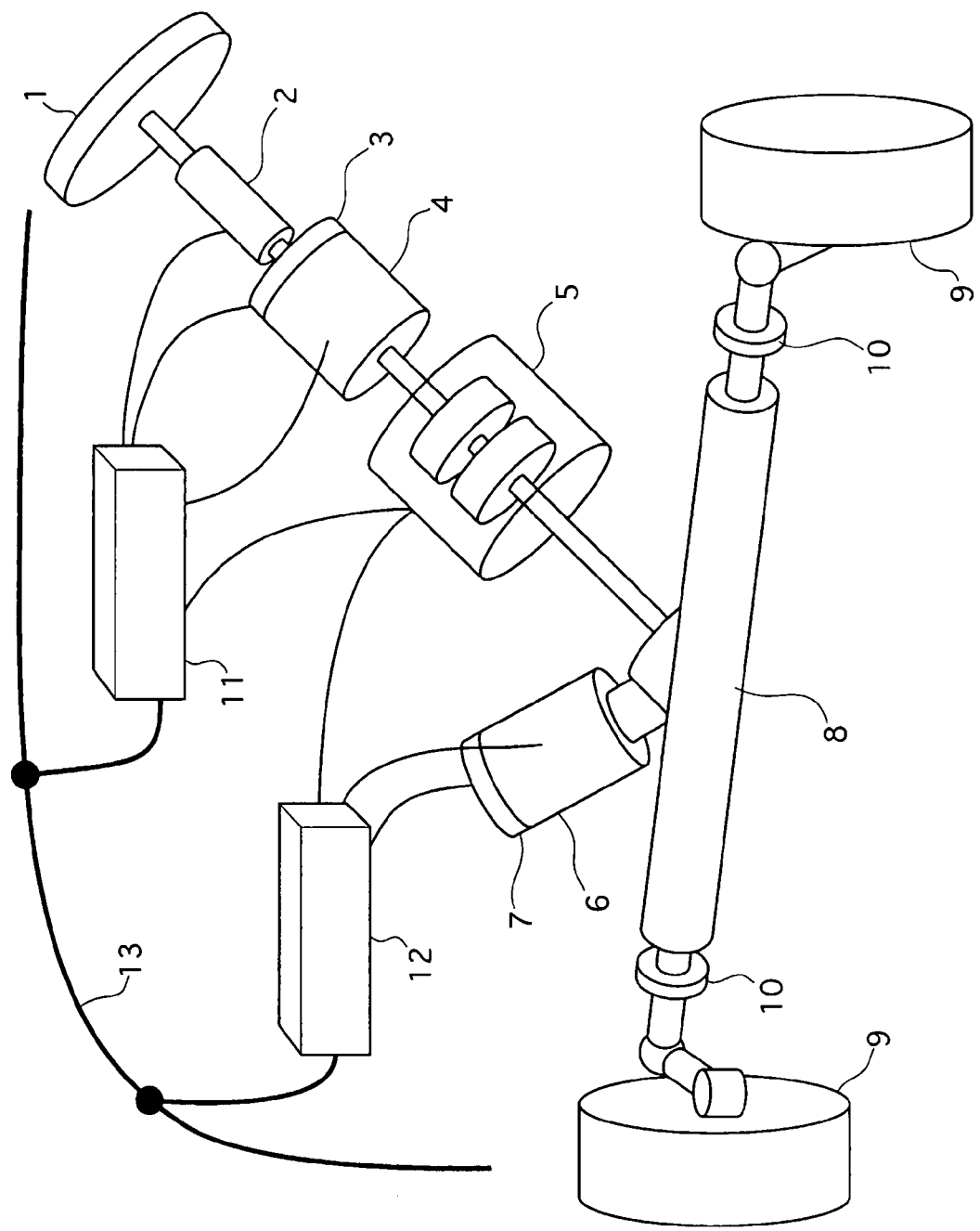
FIG. 1 is schematic view of a steer-by-wire system exemplifying a vehicle steering control apparatus in accordance with a first embodiment of the present invention.

Referring initially to FIGS. 1 to 8, a vehicle steering control apparatus is illustrated in accordance with a first embodiment of the present invention. FIG. 1 is a schematic view of a steer-by-wire (SBW) system exemplifying the vehicle steering control apparatus in accordance with the first embodiment. As shown in FIG. 1, the SBW system in accordance with the first embodiment includes a steering wheel 1 (driver operating unit), a torque sensor 2 (operating torque detector), a steering wheel operating angle sensor 3, a reaction force motor 4 (steering reaction force actuator), a clutch 5, a steering motor 6 (steering actuator), a steering motor angle sensor 7, a steering mechanism 8 (steering unit), left and right front wheels 9 (steered wheels), an axial force sensor 10, a reaction force controller 11, a steering controller 12, and a communication line 13.

The controllers 11 and 12 preferably include a microcomputer with control programs that controls various process of the steer-by-wire (SBW) system as discussed below. The controllers 11 and 12 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controllers 11 and 12 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In the SBW system in accordance with the first embodiment, the steering wheel 1 is arranged and configured to be operated by a driver. The steering mechanism 8 is arranged to be mechanically separated from the steering wheel 1 and configured to steer the left and right front wheels 9. The reaction force motor 4 is arranged and configured to impart an operation reaction force against the steering wheel 1. The steering motor 6 is arranged and configured to impart a drive force to the steering mechanism 8. The SBW system is configured such that there is no mechanical connection between the steering wheel 1 and the steering mechanism 8 during normal use with the clutch 5 in a disconnected state. The clutch 5 of the SBW system acts as a mechanical backup mechanism that enables the steering wheel 1 and the steering mechanism 8 to be connected together mechanically. In other words, when an abnormality (e.g., a malfunction) occurs in the SBW system, the clutch 5 is connected so that the vehicle can be driven safely.

Figure 2:
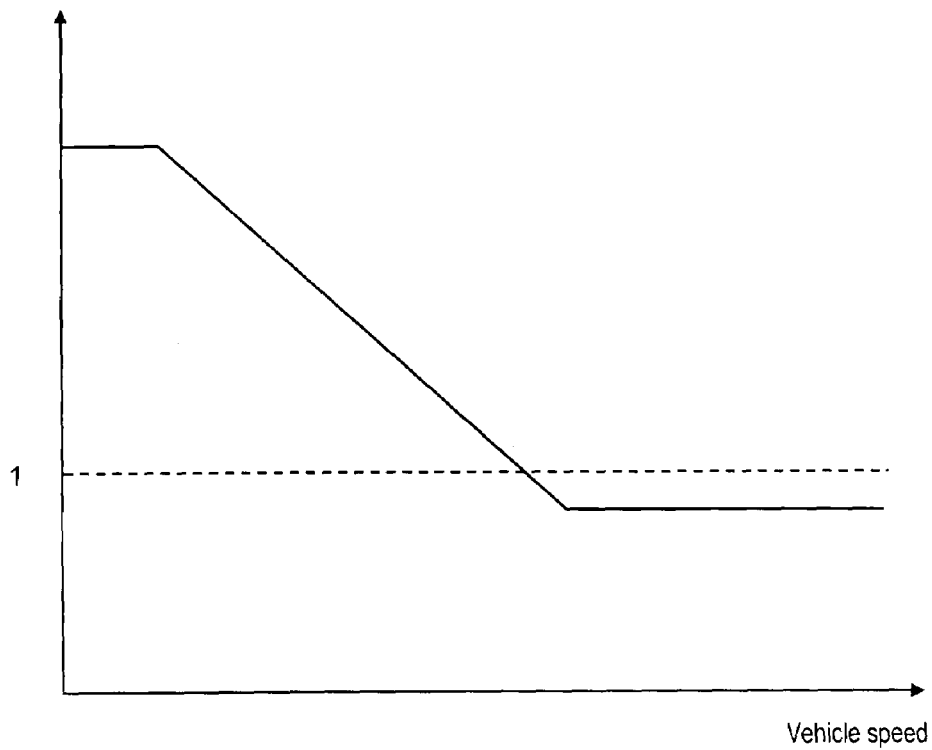
FIG. 2 is a gear ratio versus vehicle speed characteristic diagram illustrating an example of the variable gear ratio control executed by the steer-by-wire control in the first embodiment of the present invention.

In the first embodiment, the operating angle sensor 3 detects the rotary operation of the steering wheel 1 and the reaction force controller 11 calculates a command steering angle. In the first embodiment, a variable gear ratio control is executed such that, as shown in FIG. 2, for example, the steering gear ratio changes in accordance with the vehicle speed. The steering gear ratio is expressed as the ratio of the command steering angle to the operating angle (command steering angle/operating angle). The variable gear ratio control is configured such that the steering gear ratio is larger than 1 (quick steering response) when the vehicle speed is in a low speed region and smaller than 1 (slow steering response) when the vehicle speed is in a high speed region that exceeds a prescribed vehicle speed. When the variable gear ratio control is not being executed, i.e., when the steering wheel 1 and the steering mechanism 8 are mechanically connected by the clutch 5, the ratio of the command steering angle to the operating angle is 1.

The steering controller 12 calculates a drive command value for the steering motor 6 such that the actual (detected) steering angle is matched to the command steering angle. The vehicle is steered by driving the steering motor 6 based on the drive command value. The steering motor 6 is a brushless motor or another type of motor. Similarly to the steering motor 6, the reaction force motor 4 for exerting the operation reaction force against the steering wheel 1 is a brushless motor or the like and is driven based on a drive command value calculated by the reaction force controller 11. The drive command values calculated by the reaction force controller 11 and the steering controller 12 serve as current command values for the reaction force motor 4 and the steering motor 6.

In this SBW system, the reaction force motor 4 generates the operation reaction force of steering wheel 1 because the steering wheel 1 is not mechanically connected to the left and right wheels 9 and the steering motor 6. The operation reaction force is generated based on the axial force acting on a rack of the steering mechanism 8, the operating angle (rotational angle of the steering wheel), and the operating angular velocity (angular velocity at which the steering wheel is being turned). The torque sensor 2 is provided between the steering wheel 1 and the reaction force motor 4 and serves to enable the operating torque to be monitored. The torque sensor 2 is arranged and configured to detect the torsional strain or stress of the shaft and calculate the torque based on the torsional strain or stress. The value calculated by the torque sensor 2 is not used during SBW control, and thus, is normally only monitored. However, the value calculated by the torque sensor 2 is used for control during EPS mode (electric power steering mode), which is used when the reaction force motor 4 fails. During EPS mode, the clutch 5 is connected and the drive motor 6 is used in an assisting role.

Figure 3:
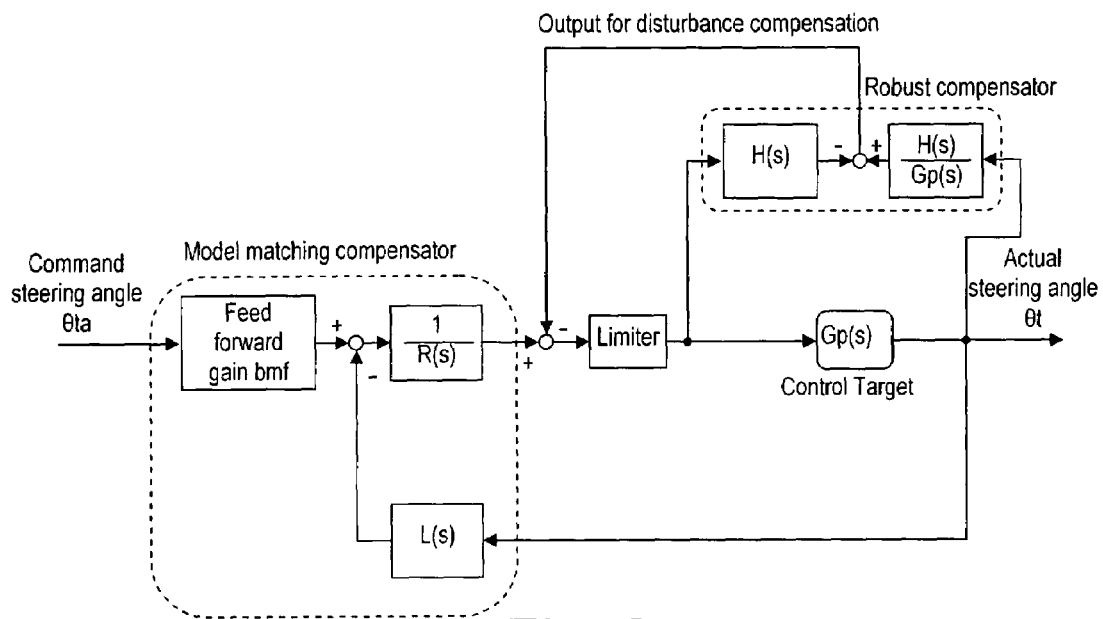
FIG. 3 is control block diagram illustrating a robust model matching method that can be used as the steering control portion of the steer-by-wire control of the first embodiment of the present invention.

The current command value calculated by the steering controller 12 is calculated with an angle servo system configured to control the actual (detected) steering angle such that it tracks the command steering angle with a prescribed response characteristic. For example, a robust model matching method like that illustrated with the steering angle control block diagram shown in FIG. 3 is applied to the calculated command steering angle θta in order to drive the steering motor 6 in such a manner as to obtain an actual (detected) steering angle θt. The robust model matching method includes a model matching compensator for matching to a predetermined characteristic and a robust compensator for estimating and canceling out control inhibiting factors (including model error) as disturbances.

Figure 4:
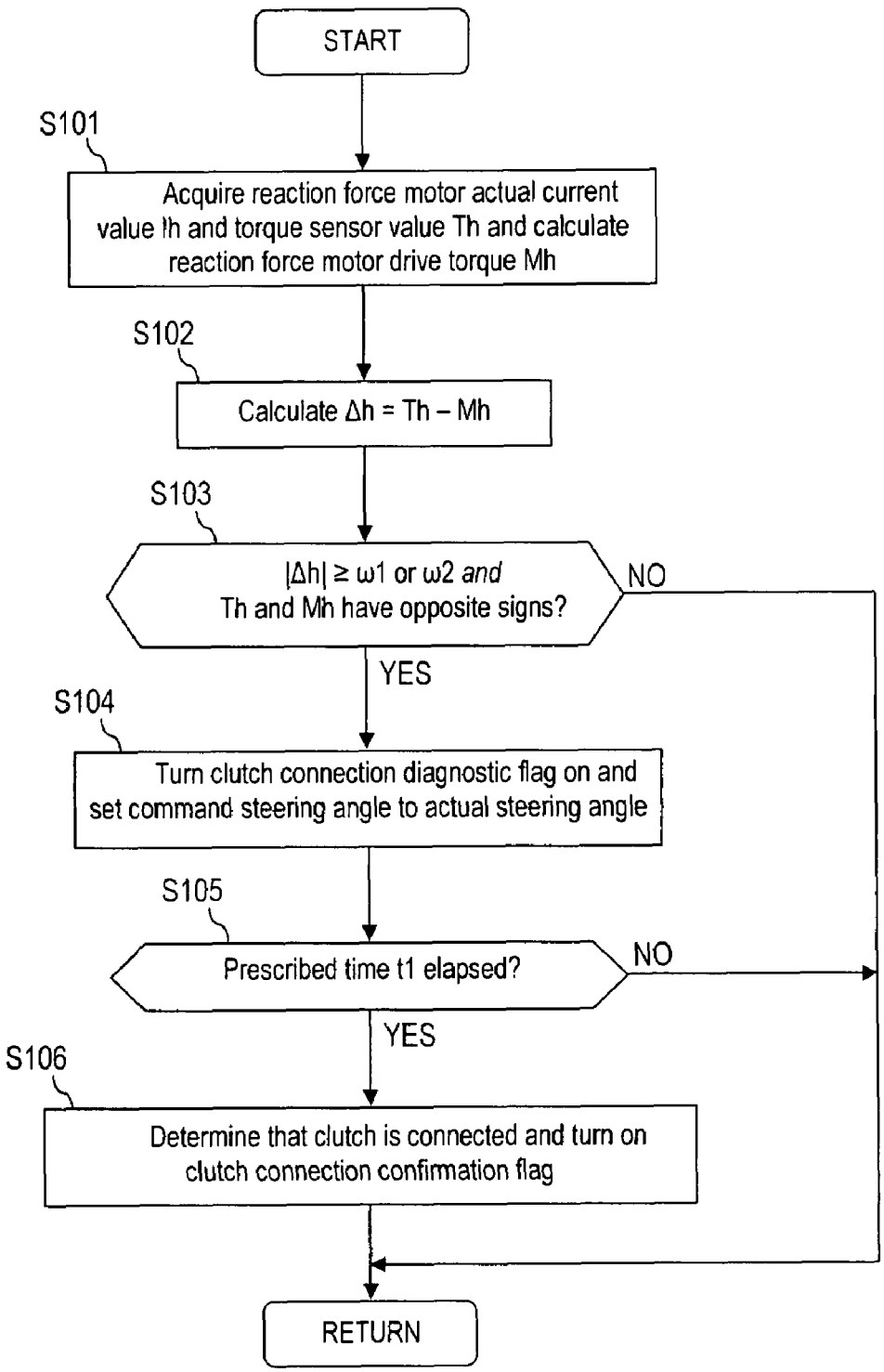
FIG. 4 is a flowchart of clutch connection determination processing executed by the operation reaction force controller and the steering controller of the first embodiment of the present invention.

FIG. 4 is a flowchart showing the clutch connection determination processing executed by the reaction force controller 11 and the steering controller 12 of the first embodiment. Each step of the flowchart will now be explained (this processing constitutes the clutch connection determiner). This processing sequence is executed by the controllers 11 and 12 once each time the SBW control cycle time elapses (e.g., every 5 msec).

In step S101, the signals used to determine if the clutch is connected are acquired and a computation is executed. More specifically, the reaction force motor actual current value Ih and the torque sensor value Th are acquired and the reaction force motor actual current value Ih is multiplied by the torque constant τh of the reaction force motor 4 to calculate the drive torque Mh of the reaction force motor 4. Control then proceeds to step S102.

In step S102, the difference Δh between the torque sensor value Th and the drive torque Mh of the reaction force motor 4 is calculated (difference calculator). Control then proceeds to step S103.

In step S103, the absolute value of the difference Δh is compared to a first threshold value ω1 and a second threshold value ω2 and the sign of the torque sensor value Th is compared to the sign of the drive torque Mh of the reaction force motor 4. If the difference Δh is equal to or larger than the first threshold value ω1 or the second threshold value ω2 and the signs of the torque sensor value Th and the drive torque Mh are opposite each other, then the result of step S103 is "Yes" and control proceeds to step S104. Otherwise, the result of step S103 is "No" and the controller returns to the beginning of the control sequence.

The threshold values ω1 and ω2 for the absolute value of the difference Δh are determined experimentally in consideration of the difference between the response of the reaction force motor 4 (i.e., the control delay from reception of the command current until the actual current reaches the command current value and the delay of the current sensor) and the response of the torque sensor 2.

The first threshold value ω1 is for when the steering wheel 1 is operated in one direction so as to turn wider or to return toward a non-turning position and the second threshold value ω2 is for when the steering wheel 1 is operated such that the operating torque direction thereof is changed. The second threshold value ω2 is set to be larger than the first threshold value ω1.

In step S104, a clutch connection diagnostic flag is raised and the command steering angle is set to the actual (detected) steering angle. Control then proceeds to step S105.

Step S104 constitutes the processing executed while connection of the clutch 5 is being diagnosed. If the clutch 5 is connected, then the difference between the command steering angle and the actual (detected) steering angle will not diminish and the steering wheel 1 will be turned independently of operation by the driver. Therefore, the command steering angle is set to the actual (detected) steering angle in order to suppress the occurrence of control behavior that causes the steering wheel 1 to turn independently of operation of the steering wheel 1 by the driver.

In step S105, a determination is made as to whether or not a prescribed amount of time t1 has elapsed. If so (Yes), then control proceeds to step S106. If not (No), then control returns.

The prescribed amount of time t1 is the waiting time for the clutch connection diagnosis. Although it is necessary to determine if the clutch 5 is connected as early as possible in order to prevent the steering wheel 1 from being turned independently of the operation thereof by the driver, the prescribed time t1 is set to, for example 10 msec in consideration of the effects of noise.

In step S106, it is determined that the clutch 5 is connected and a clutch connection confirmation flag is raised. Then, control returns.

The drive torque Mh of the reaction force motor 4 is employed in this embodiment of the present invention. However, it will be apparent to those skilled in the art from this disclosure that the drive command values calculated by the reactive force controller 11 can also be employed to carry out the present invention.

The operational actions of the first embodiment will now be explained.

Figure 5:
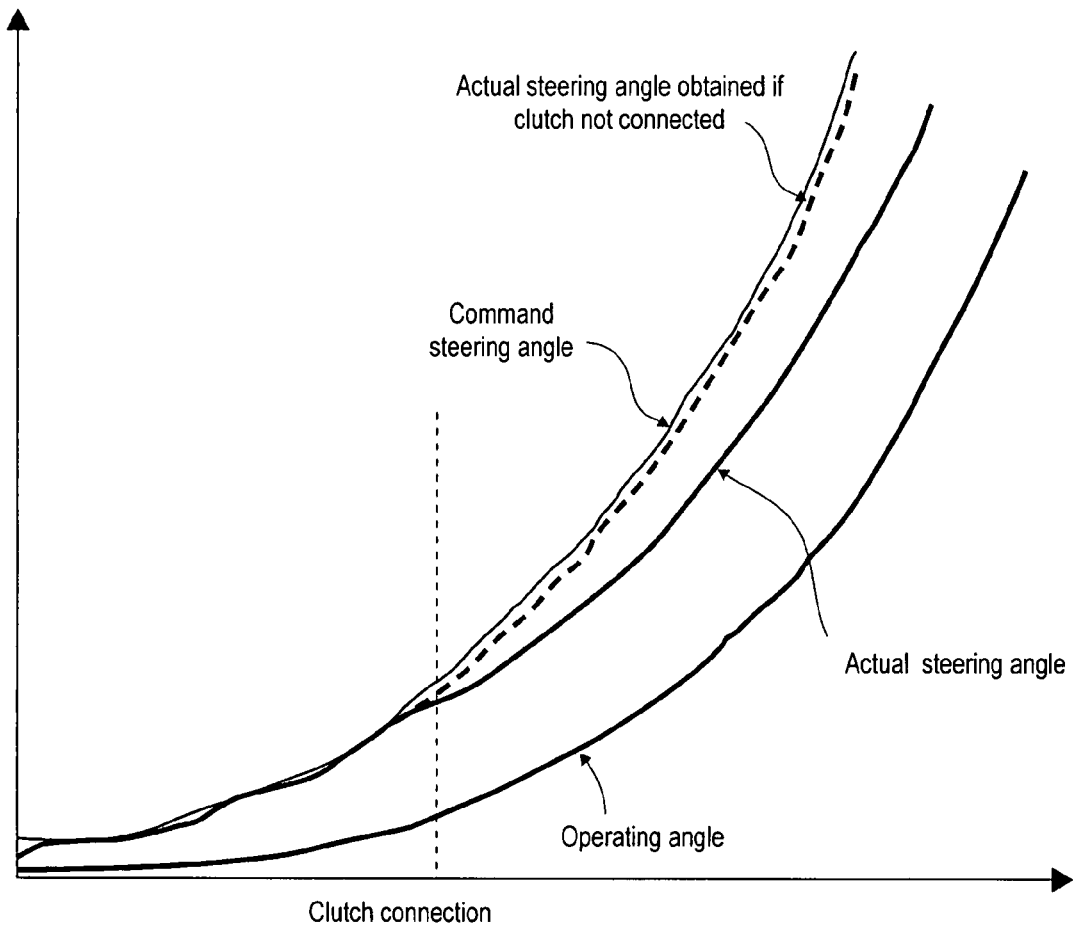
FIG. 5 is a characteristic plot illustrating an example of the relationships among the steering wheel operating angle, the actual (detected) steering angle, and the command steering angle when the clutch is connected.

In the SBW system like that described previously, normal SBW control is continued by the reaction force controller 11 and the steering controller 12 even if the clutch 5 is connected during SBW control. The reaction force controller 11 calculates a command steering angle based on the steering wheel operating angle, and the steering controller 12 executes steering angle control such that the actual (detected) steering angle tracks (follows) the command steering angle with a prescribed response characteristic (model response). In such a case (i.e., a case in which the clutch 5 is connected during SBW control), the steering wheel 1 is turned along with the movement of the left and right front wheels 9 (which are steered wheels) because the steering wheel 1 and the steering motor 6 are connected by the clutch 5. The reaction force controller 11 then calculates a command steering angle based on the operating angle of the steering wheel 1, which has been turned due to the SBW control. The steering controller 12 receives this command steering angle and controls the steering motor current command value such that the steering angle is turned further in accordance with the position of the steering wheel 1. This, in turn, causes the steering wheel 1 to rotate even further. Consequently, when the clutch 5 is connected, the command steering angle and the actual (detected) steering angle do not converge, as shown in FIG. 5. Thus, there is the possibility that the steering motor current command value will increase and cause the steering wheel 1 to turn independently of the operation of the steering wheel by the driver. Also, as shown in FIG. 5, after the clutch 5 is connected, the difference between the actual (detected) steering angle and the steering wheel operating angle (conversion value obtained by multiplying the steering angle by the steering gear ratio).

Conversely, by appropriately determining when the clutch 5 is connected, a vehicle steering control apparatus in accordance with the first embodiment enables a driver to continue operating the steering wheel 1 even when the SBW control is being continued at the steering mechanism 8 (steering unit).

Thus, when the steering wheel 1 is operated while the clutch 5 is released such that the driver operating unit and the steering unit are separated from each other, there is no transfer of steering torque from the steering unit to the driver operating unit through the clutch 5. Consequently, at the driver operating unit, the direction of the drive torque Mh imparted to the reaction force motor 4 (hereinafter called "reaction force motor drive torque Mh") and the direction of the torque sensor value Th detected by the torque sensor 2 (hereinafter called "torque sensor value Th") are the same. However, when the clutch 5 is connected, the drive torque is transferred from the steering unit to the driver operating unit through the clutch and the direction of the drive torque becomes opposite the direction of the operating torque. Consequently, at the driver operating unit, the direction of either the torque sensor value Th or the reaction force motor drive torque Mh reverses such that the direction of the reaction force motor drive torque Mh and the direction of the torque sensor value Th are opposite each other.

The first embodiment determines if the clutch 5 is connected based on the fact that when the clutch 5 is connected during SBW control, the direction of the reaction force motor drive torque Mh and the direction of the torque sensor value Th change from a state of being the same to a state of being opposite each other. The apparatus determines that the clutch 5 is connected when the direction of the reaction force motor drive torque Mh and the direction of the torque sensor value Th are different.

Thus, it is possible to determine if the clutch 5 is connected by utilizing this relationship between the direction of the reaction force motor drive torque Mh and the direction of the torque sensor value Th, i.e., by determining if the direction of the reaction force motor drive torque Mh and the direction of the torque sensor value Th are different. Furthermore, as described above, since connection of the clutch 5 is determined appropriately, the driver is able to continue operating the steering wheel even if SBW control continues at the steering unit.

The operational actions accomplished by a vehicle steering control apparatus in accordance with the first embodiment in the following situations will now be explained. First, when the clutch 5 is connected while the steering wheel 1 is being operated in one direction will be explained. Then, second, when the clutch 5 is connected while the operating torque direction of the steering wheel 1 is being reversed. Then, third, when the steering wheel 1 is released while the clutch 5 is connected will be explained. The operational action related to determining that the clutch 5 is connected after the clutch 5 has been connected will also be explained.

Figure 6:
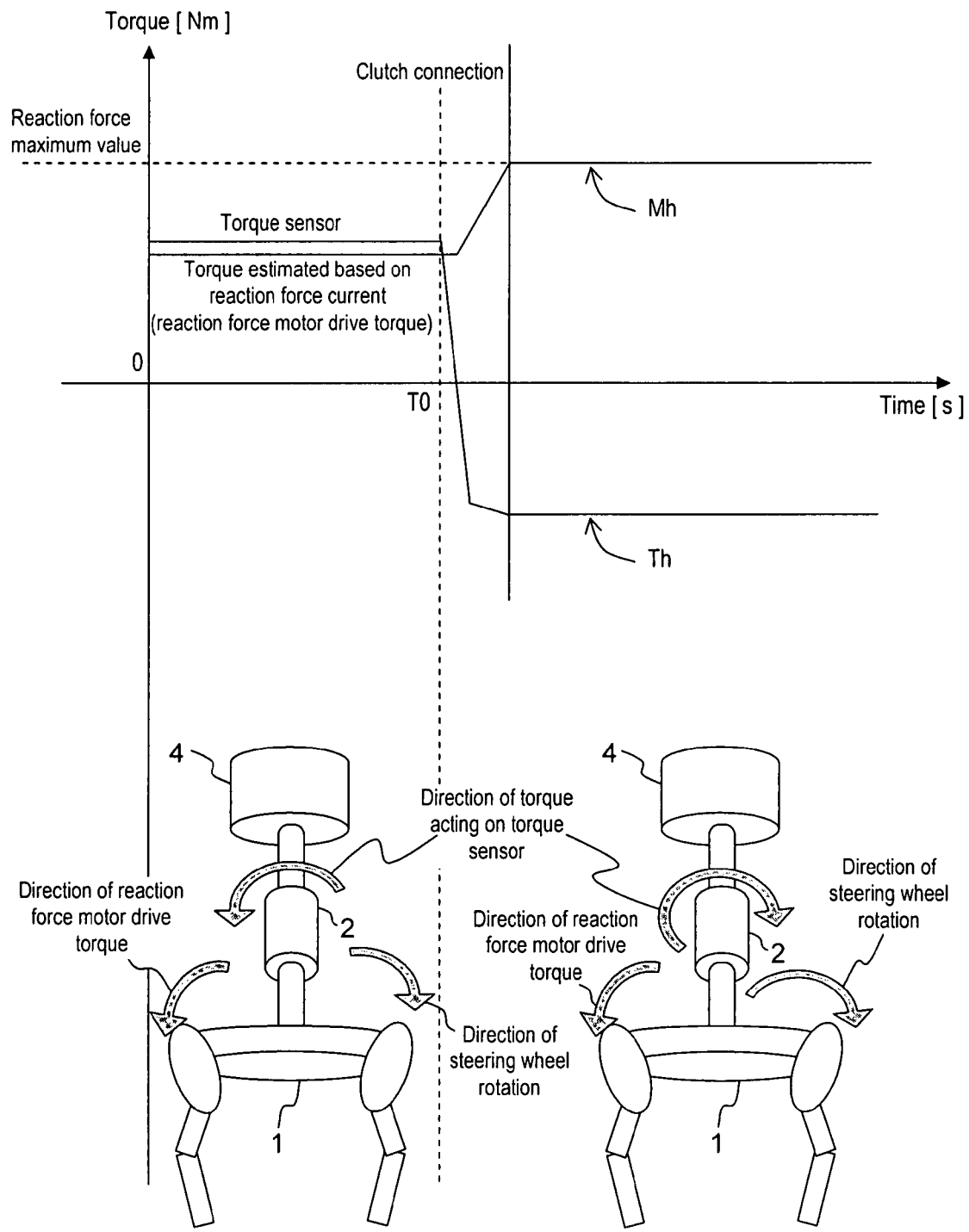
FIG. 6 is a characteristic plot of the reaction force motor drive torque and the torque sensor value and a schematic view illustrating how the torques and rotational directions change after the clutch is connected in a situation in which the clutch is connected while the steering wheel is being operated in one direction.

When the clutch 5 is released and SBW control is being executed normally, the torque sensor characteristic (torque sensor value Th) and the reaction force motor torque characteristic (reaction force motor drive torque Mh) estimated based on the reaction force current have the same sign and are substantially equal to each other until the clutch 5 is connected at time T0, as shown in FIG. 6. FIG. 6 illustrates an example in which the steering wheel 1 is being turned to the right.

When the clutch 5 is connected, the direction of the torque acting on the torque sensor 2 is reversed in comparison with the direction the torque would act if the clutch 5 was released because the torque of the steering motor 6 is transferred to the driver operating unit through the clutch 5. Meanwhile, since the steering wheel 1 is rotated in the same direction as it was before the clutch 5 was connected, the reaction force controller 11 calculates a command current value for the reaction force motor 4 that causes the reaction force motor 4 to generate a torque in the same direction as before the clutch 5 was connected.

Thus, as is clear from the characteristic curves shown in FIG. 6, when the clutch 5 is connected, i.e., after the connection time T0, the value of the reaction force motor drive torque Mh determined based on the current value of the reaction force motor 4 increases toward a maximum reaction force value and the value of the torque sensor value Th decreases to a negative torque value having the opposite direction as the torque sensor value Th that existed before the clutch 5 was connected.

Figure 7:
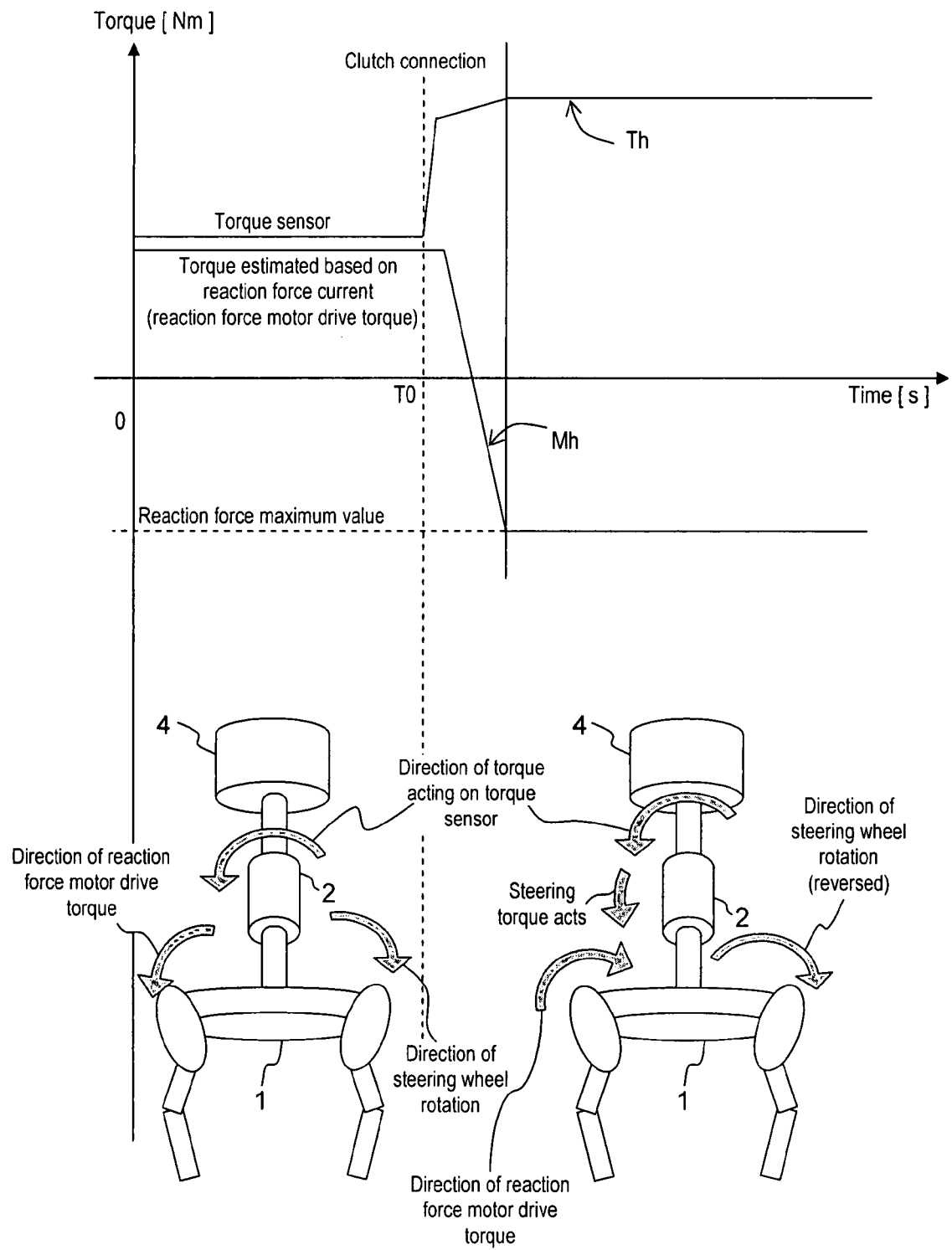
FIG. 7 provides a characteristic plot of the reaction force motor drive torque and the torque sensor value and a schematic view illustrating how the torques and rotational directions change after the clutch is connected in a situation in which the clutch is connected while the direction in which the steering wheel is operated is being reversed.

When the clutch 5 is released and SBW control is being executed normally, the torque sensor characteristic (torque sensor value Th) and the reaction force motor torque characteristic (reaction force motor drive torque Mh) estimated based on the reaction force current have the same sign and are substantially equal to each other until the clutch 5 is connected at time T0, as shown in FIG. 7. FIG. 7 illustrates an example in which the steering wheel 1 is being turned to the right before being reversed toward the left.

If the clutch 5 is connected when the steering wheel 1 is reversed toward the left, then the torque acting on the torque sensor 2 will increase. This increase of torque acting on the torque sensor 2 occurs because the steering wheel 1 is being rotated in the opposite direction as before the clutch connection and the steering controller 12 is calculating a command current value for the steering motor 6 that causes the steering motor 6 to generate a torque in the opposite direction as before the clutch connection. In short, the steering torque is added to the torque that would exist if the clutch 5 was not connected. Meanwhile, since the steering wheel 1 is rotated in the opposite direction as it was before the clutch 5 was connected, the reaction force controller 11 calculates a command current value for the reaction force motor 4 that causes the reaction force motor 4 to generate a torque in the opposite direction as before the clutch 5 was connected.

Thus, as is clear from the characteristic curves shown in FIG. 7, when the clutch 5 is connected, i.e., after the connection time T0, the torque sensor value Th increases while maintaining the same direction as the torque sensor value Th that existed before the clutch 5 was connected and the value of the reaction force motor drive torque Mh determined based on the current value of the reaction force motor 4 decreases toward a maximum reaction force value and becomes opposite in direction to the reaction force motor drive torque Mh that existed before the clutch 5 was connected.

Figure 8:
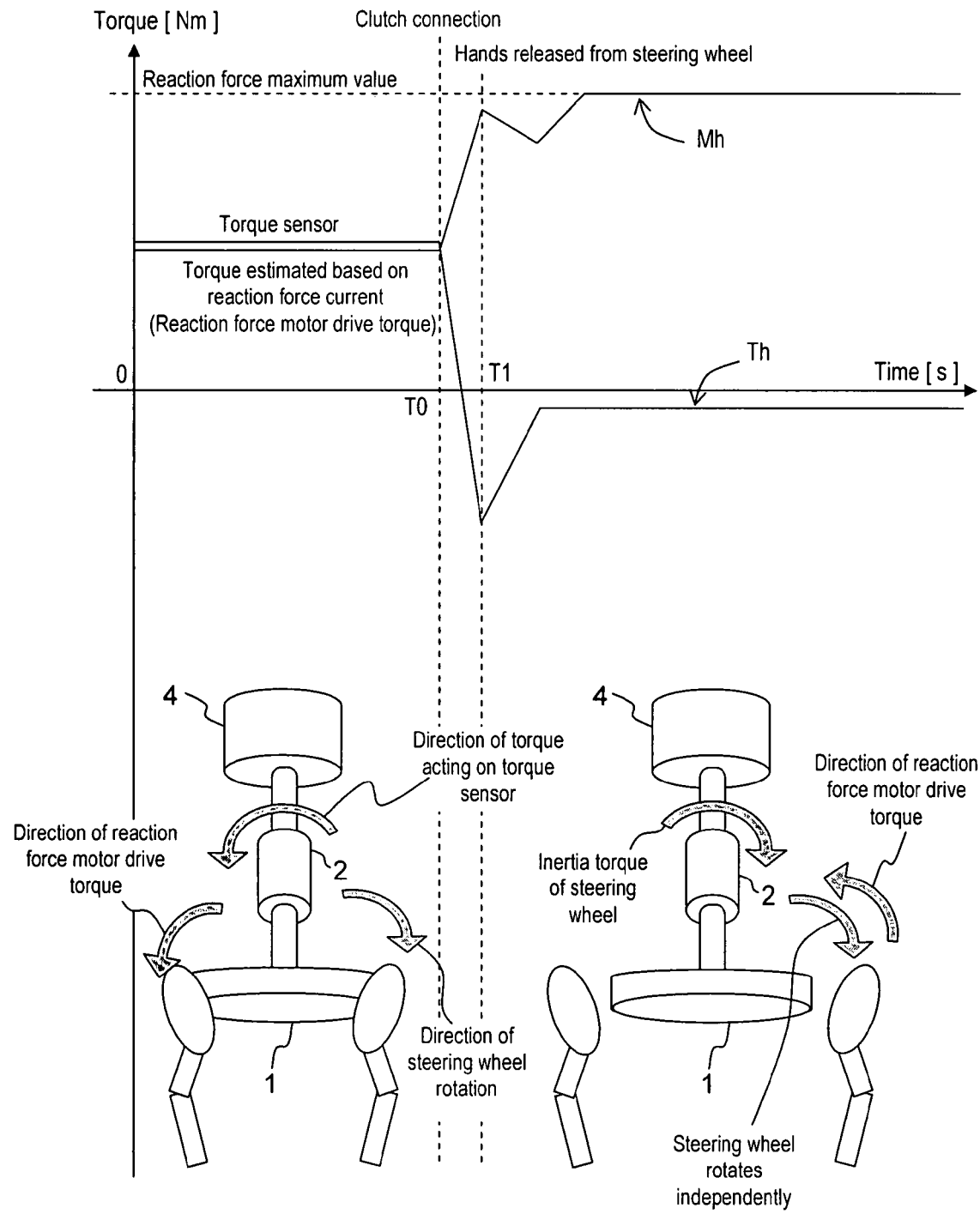
FIG. 8 is a characteristic plot of the reaction force motor drive torque and the torque sensor value and a schematic view illustrating how the torques and rotational directions change after the clutch is connected in a situation in which the clutch is connected while the steering wheel is being operated in one direction and, afterwards, the steering wheel is released by the driver.

When the clutch 5 is released and SBW control is being executed normally, the torque sensor characteristic (torque sensor value Th) and the reaction force motor torque characteristic (reaction force motor drive torque Mh) estimated based on the reaction force current have the same sign and are substantially equal to each other until the clutch 5 is connected at time T0, as shown in FIG. 8. FIG. 8 illustrates an example in which the steering wheel 1 is being turned to the right before being released.

When the clutch 5 is connected, the direction of the torque acting on the torque sensor 2 is reversed in comparison with the direction in which the torque would act if when the clutch 5 was released because the torque of the steering motor 6 is transferred to the driver operating unit through the clutch 5. Meanwhile, since the steering wheel 1 is rotated in the same direction as it was before the clutch 5 was connected, the reaction force controller 11 calculates a command current value for the reaction force motor 4 that causes the reaction force motor 4 to generate a torque in the same direction as before the clutch 5 was connected.

Thus, as is clear from the characteristic curves shown in FIG. 8, during the period from when the clutch 5 is connected at a time T0 until the steering wheel 1 is released, the value of the reaction force motor drive torque Mh determined based on the current value of the reaction force motor 4 increases toward a maximum reaction force value and the value of the torque sensor value Th decreases to a negative torque value having the opposite direction as the torque sensor value Th that existed before the clutch 5 was connected.

Then, as shown in FIG. 8, when the steering wheel 1 is released at a time T1, the torque sensor value Th settles at a value where the inertia force of the steering wheel 1 is balanced out because the driver's hand is not supporting the steering wheel 1. Even if the driver releases the steering wheel 1 at the moment when the clutch 5 is connected, the torque sensor value Th change to the opposite direction (opposite sign) as it was before the clutch 5 was connected.

Meanwhile, since the steering wheel 1 is turned in the direction of turning further due to being released by the automatic steering control, the value of the reaction force motor drive torque Mh increases to a maximum reaction force value because the command current is calculated so as to generate a torque in the same direction as before the clutch 5 was connected (a torque in the opposite direction will not be generated due to the reaction force control characteristic) and the actual current follows the command current.

As described heretofore regarding situations in which the clutch 5 is connected while the steering wheel 1 is being operated in one direction, situations in which the clutch 5 is connected while the operating torque direction of the steering wheel 1 is being reversed, and situations in which the steering wheel 1 is released while the clutch 5 is connected, the relationship wherein the direction of the reaction force motor drive torque Mh and the direction of the torque sensor value Th become different when the clutch 5 is connected holds true in various steering wheel operation situations.

Thus, after the clutch 5 is connected, an appropriate determination that the clutch 5 is connected can be obtained when the following three conditions are satisfied.

(a) The absolute value of the difference Δh is equal to or larger than ω1 or ω2 (difference condition).

(b) The signs of Th and Mh are different (direction condition).

(c) The conditions (a) and (b) have been satisfied continuously for a prescribed amount of time t1 (time condition).

As a result, when a connection of the clutch 5 occurs, the driver can be allowed to continue operating the steering wheel 1 after the clutch connection has been determined (detected) by doing any one of the following: releasing the clutch 5, shifting to an EPS mode in which the clutch 5 is connected and the reaction force motor 4 or the steering motor 6 is used as an assist motor, or using the connected clutch 5 as a direct mechanical connection between the steering wheel 1 and the steered wheels.

As described previously, a vehicle steering control apparatus in accordance with the first embodiment is provided with a difference calculator (step S102) configured to calculate the difference Δh between the drive torque Mh imparted to the reaction force motor 4 and the torque sensor value Th detected by the torque sensor 2. The clutch connection determiner (FIG. 4) determines that the clutch 5 is in a connected state when the absolute value of the difference Δh calculated by the difference calculator is equal to or larger than a threshold value ω and the direction of the drive torque Mh imparted to the reaction force motor 4 is different from the direction of the torque sensor value Th detected by the torque sensor 2 (result of step S103 is "Yes").

If the condition regarding the difference between the reaction force motor drive torque and the torque sensor value were not included, then it would be possible for the apparatus to incorrectly detect that the clutch 5 was connected when it was not connected. Such an incorrect diagnosis could occur when, for example, the steering wheel 1 is operated so as to undergo a slight reversal in operating direction in order to adjust the steering direction. In such a case, the reaction force motor drive torque and the torque sensor value would be small and the difference there-between would be small, but the signs, i.e., directions, of the reaction force motor drive torque and the torque sensor value would be opposite each other because of the difference between the reaction force motor response and the torque sensor response.

Since the first embodiment includes the difference condition in addition to the condition regarding the opposite signs of the reaction force motor drive torque Mh and the torque sensor value Th, an incorrect diagnosis can be avoided in situations where the condition that the signs of the reaction force motor drive torque Mh and the torque sensor value Th be opposite is satisfied but the magnitude of the difference Δh is small. As a result, the connection of the clutch 5 can be determined with good accuracy.

In a vehicle steering control apparatus in accordance with the first embodiment, the clutch connection determiner (FIG. 4) is configured to set the following as the threshold value ω to be compared with the absolute value of the difference Δh: a first threshold value ω1 for when the steering wheel 1 is operated in one direction so as to turn wider or to return toward a non-turning position and a second threshold value ω2 for when the steering wheel 1 is operated such that the operating torque direction thereof is changed (reversed). Additionally, the second threshold value ω2 is larger than the first threshold value ω1. For example, when the clutch is connected, the difference between the reaction force motor drive torque and the torque sensor value increases abruptly (see FIGS. 6, 7, and 8). Although a smaller threshold value for the difference is better from the standpoint of obtaining an appropriate determination, the chances of obtaining an incorrect diagnosis increase when a smaller threshold value is used. Meanwhile, when the direction in which the steering wheel 1 is being operated is reversed, a certain degree of difference occurs between the reaction force motor drive torque and the torque sensor value due to the response time of the current value of the reaction force motor. The first embodiment addresses this issue by setting the second threshold value ω2 for when the operating direction of the steering wheel 1 is reversed to a larger value than the threshold value ω1 for when the steering wheel 1 is operated in one direction so as to turn wider or to return toward a non-turning position. This approach makes it possible to avoid incorrect diagnoses in cases in which the steering wheel 1 is reversed while still enabling connection of the clutch 5 to be determined appropriately.

In a vehicle steering control apparatus in accordance with the first embodiment, the clutch connection determiner (FIG. 4) is configured to raise a clutch connection diagnostic flag and set the command steering angle to the actual (detected) steering angle (step S104) when the condition regarding the difference between the reaction force motor drive torque Mh and the torque sensor value Th and the condition regarding the signs of the reaction force motor drive torque Mh and the torque sensor value Th being different are both satisfied.

In order to avoid an incorrect diagnosis, the clutch connection determiner can be configured such that it does not determine that the clutch is connected until it has confirmed that the aforementioned conditions are being satisfied in a continuous manner. However, if the clutch is connected while the clutch connection determiner is waiting with the conditions satisfied, the difference between the command steering angle and the actual (detected) steering angle will not diminish and the steering wheel 1 will be turned independently of operation by the driver.

The first embodiment resolves this issue by raising the clutch connection diagnostic flag and setting the command steering angle to the actual (detected) steering angle when the aforementioned conditions are satisfied. In this way, the difference between the command steering angle and the actual (detected) steering angle is eliminated during the period when the clutch connection determiner is waiting while the conditions continue to be satisfied. As a result, the occurrence of control behavior that causes the steering wheel 1 to turn independently of operation by the driver during the waiting period before the clutch connection is confirmed can be suppressed.

In a vehicle steering control apparatus in accordance with the first embodiment, the clutch connection determiner (FIG. 4) is configured to determine that the clutch 5 is connected and raise a clutch connection confirmation flag (step S106) when the clutch connection diagnostic flag has been in a raised state continuously for a prescribed amount of time t1 or longer (result of step S105 is "Yes").

If the clutch 5 was determined to be connected immediately whenever both the difference condition and the sign condition (direction condition) were satisfied, then the clutch connection determiner would mistakenly determine that the clutch 5 was connected (even though it was not) in situations where the difference condition and the sign condition were both satisfied momentarily due to the effects of noise. However, in addition to the difference condition and the sign condition (direction condition), the first embodiment includes a time condition that requires the difference condition and the sign condition to remain satisfied for a prescribed amount of time t1 in order to determine that the clutch 5 is connected. Consequently, an incorrect diagnosis can be avoided even if noise causes the difference condition and the sign condition to be satisfied momentarily.

The effects of the first embodiment will now be explained.

A vehicle steering control apparatus in accordance with the first embodiment achieves the effects listed below.

(1) The vehicle steering control apparatus includes the steering wheel 1 to be operated by a driver, the steering mechanism 8 arranged to be mechanically separated from the steering wheel 1 and configured to steer the left and right front wheels 9, the reaction force motor 4 imparts an operation reaction force against the steering wheel 1, the steering motor 6 imparts a turning force to the steering mechanism 8, the clutch 5 arranged and configured to mechanically connect and disconnect the steering wheel 1 to and from the steering mechanism 8, the torque sensor 2 detects an operating torque imparted to the steering wheel 1, and the clutch connection determiner (FIG. 4) determines that the clutch 5 is in a connected state when the direction of a drive torque Mh imparted to the reaction force motor 4 and the direction of a torque sensor value detected by the torque sensor 2 are different. As a result, connection of the clutch 5 can be determined appropriately and the driver can continue operating the steering wheel 1 even when SBW control is continued at the steering mechanism 8.

(2) The vehicle steering control apparatus is provided with a difference calculator (step S102) configured to calculate the difference $\Delta h$ between the drive torque Mh imparted to the reaction force motor 4 and the torque sensor value Th detected by the torque sensor 2, and the clutch connection determiner (FIG. 4) is configured to determine that the clutch 5 is in a connected state when the absolute value of the difference $\Delta h$ calculated by the difference calculator is equal to or larger than a threshold value $\omega$ and the direction of the drive torque Mh imparted to the reaction force motor 4 and the direction of the torque sensor value detected by the torque sensor 2 are different (result of step S103 is "Yes"). Consequently, the apparatus avoids making incorrect diagnoses when the condition that the signs of the reaction force motor drive torque Mh and the torque sensor value Th be different is satisfied but the magnitude of the difference $\Delta h$ is small. As a result, the connection of the clutch 5 can be determined with good accuracy.

(3) The clutch connection determiner (FIG. 4) is configured to set the following as the threshold value $\omega$ to be compared with the absolute value of the difference $\Delta h$: a first threshold value $\omega 1$ for when the steering wheel 1 is operated in one direction so as to turn wider or to return toward a non-turning position and a second threshold value $\omega 2$ for when the steering wheel 1 is operated such that the operating torque direction thereof is changed (reversed). Additionally, the second threshold value $\omega 2$ is larger than the first threshold value $\omega 1$. As a result, incorrect diagnoses occurring when the steering wheel 1 is reversed can be avoided while still enabling connection of the clutch 5 to be determined appropriately.

(4) The clutch connection determiner (FIG. 4) is configured to raise a clutch connection diagnostic flag and set the command steering angle to the actual (detected) steering angle when the difference condition and the sign condition of the reaction force motor drive torque Mh and the torque sensor value Th are satisfied (step S104). In this way, the difference between the command steering angle and the actual (detected) steering angle is eliminated during the period when the clutch connection determiner is waiting while the conditions continue to be satisfied. As a result, the occurrence of control behavior that causes the steering wheel 4 to turn independently of operation by the driver during the waiting period before the clutch connection is confirmed can be suppressed.

(5) The clutch connection determiner (FIG. 4) is configured to determine that the clutch 5 is connected and raise a clutch connection confirmation flag (step S106) when the clutch connection diagnostic flag has been in a raised state continuously for at least a prescribed amount of time t1 (result of step S105 is "Yes"). As a result, an incorrect diagnosis can be avoided even if noise causes the difference condition and the sign condition to be satisfied momentarily.

Variations will now be explained in which the apparatus is configured to release the clutch connection using the steering motor or the reaction force motor when it determines that the clutch is connected.

The constituent features of the system are the same as those shown in FIGS. 1 to 3 and explanations thereof are omitted here for the sake of brevity.

Figure 9:
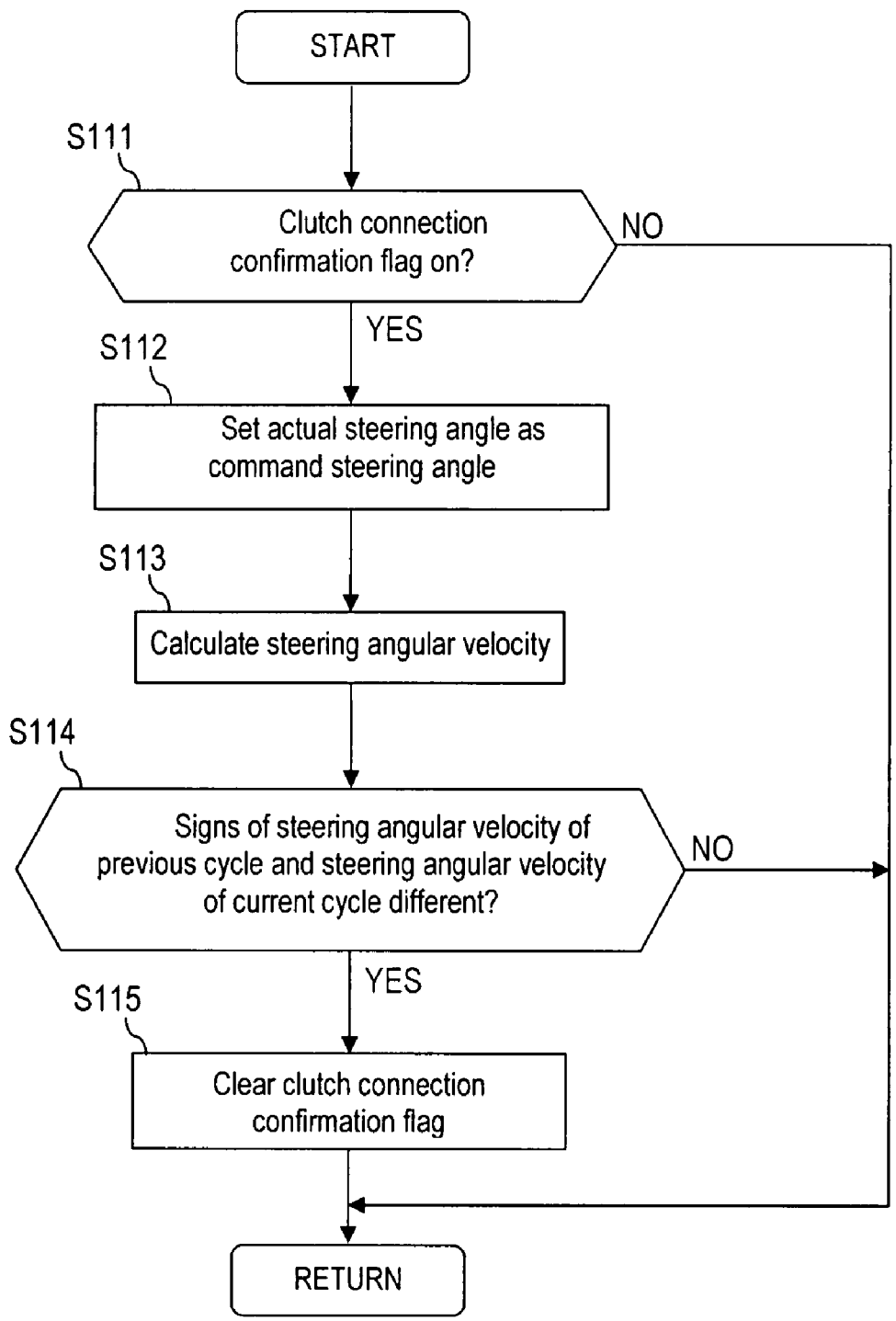
FIG. 9 is a flowchart of the clutch connection release processing executed by the operation reaction force controller and the steering controller of a first variation of the first embodiment of the present invention.

FIG. 9 is a flowchart showing the clutch connection releasing processing executed by the reaction force controller 10 and the steering controller 11 of a first variation. Each step of the flowchart will now be explained (this processing constitutes the clutch connection releasing device). This processing sequence is executed by the controllers 11 and 12 once each time the SBW control cycle time elapses (e.g., every 5 msec).

In step S111, a determination is made as to whether or not the clutch connection confirmation flag has been raised by the clutch connection determining processing. If so (Yes), then control proceeds to step S112. If not (No), then control returns.

In step S112, the actual (detected) steering angle is set as the command steering angle and the steering motor 6 is driven based on the command steering angle. Control then proceeds to step S313.

When the steering motor 6 is driven using the actual (detected) steering angle as the command steering angle, it exerts a drive torque in the opposite direction as the clutch connection direction and, thus, the connection of the clutch 5 can be released.

In step S113, the steering angular velocity θt' is calculated by executing computational processing contrived to differentiate the actual (detected) steering angle θt detected by the steering motor angle sensor 7 with respect to time. Control then proceeds to step S114.

In step S114, a determination is made as to whether or not the current value of the steering angular velocity θt' has the opposite sign as in the previous control cycle. If so (Yes), then control proceeds to step S115. If not (No), then control returns.

In other words, step S114, it is determined that the steering motor 6 has exerted a torque in the opposite direction if the sign of the steering angular velocity θt' has reversed (i.e., changed from positive to negative or from negative to positive).

The steering angular velocity θt' is monitored in order to determine if the steering motor 6 has actually started moving in a manner that takes into account the inertia and current control response of the steering motor 6. This approach makes it possible to reliably determine if the connection of the clutch 5 has been released.

In step S115, the clutch connection confirmation flag is cleared and SBW control is executed with the variable gear ratio set to 1:1. Control returns.

Figure 10:
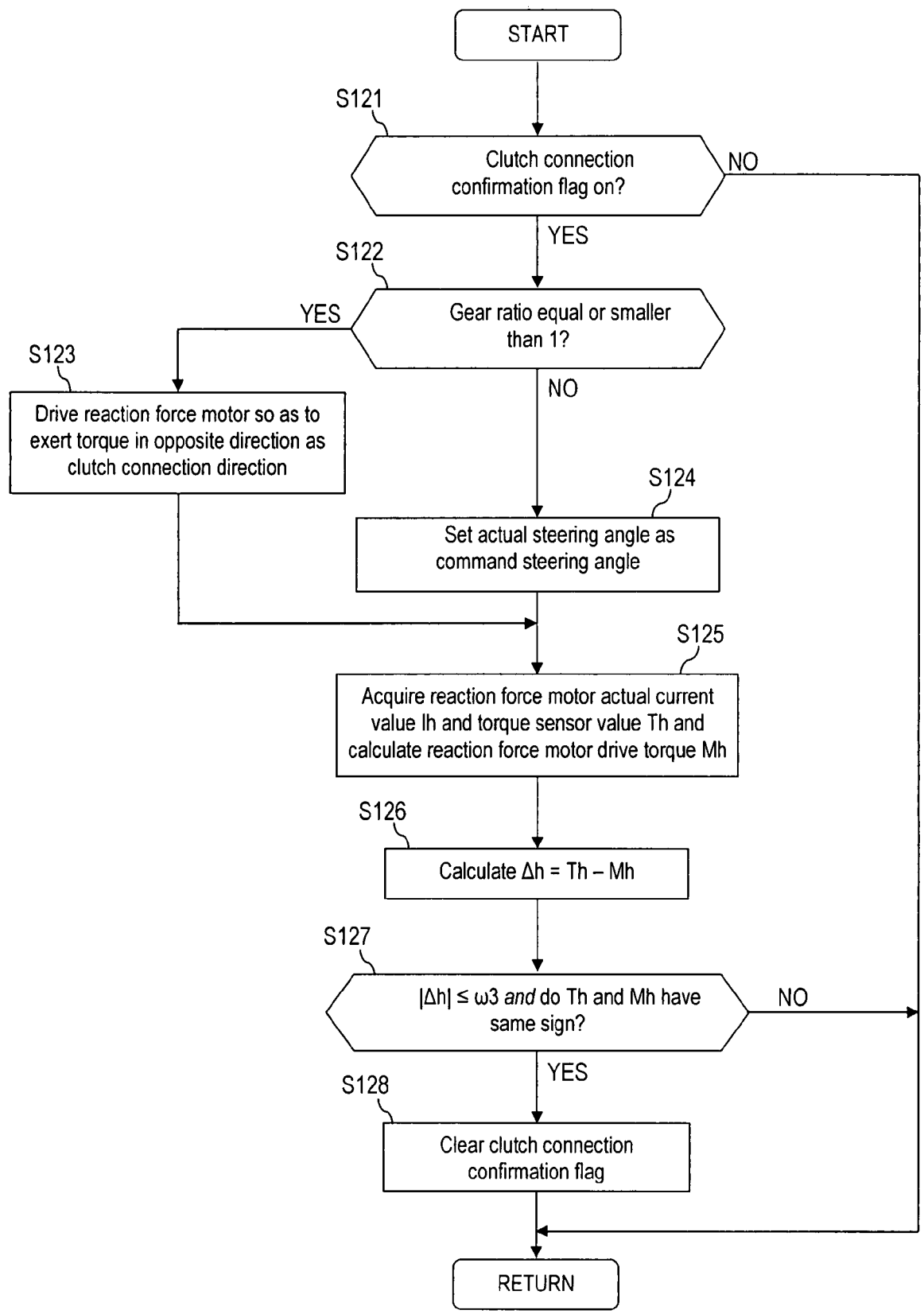
FIG. 10 is a flowchart of the clutch connection release processing executed by the operation reaction force controller and the steering controller of the second variation of first embodiment of the present invention.

FIG. 10 is a flowchart showing the clutch connection releasing processing executed by the reaction force controller 10 and the steering controller 11 of a second variation. Each step of the flowchart will now be explained (this processing constitutes the clutch connection releasing device). This processing sequence is executed by the controllers 11 and 12 once each time the SBW control cycle time elapses (e.g., every 5 msec).

In step S121, a determination is made as to whether or not the clutch connection confirmation flag has been raised by the clutch connection determining processing. If so (Yes), then control proceeds to step S122. If not (No), then control returns.

In step S122, a determination is made as to whether or not the steering gear ratio is equal to or less than 1. If so (Yes), then control proceeds to step S 123. If not (No), then control proceeds to step S124.

In step S123, a torque oriented in the opposite direction as the connection direction is exerted by the reaction force motor 4. Control then proceeds to step S125.

More specifically, when the clutch 5 is connected and a variable gear ratio control is being executed such that the gear ratio is equal to or less than 1 (see FIG. 2), the connection of the clutch 5 can be released by setting the command current value of the reaction force motor 4 to such a value that the reaction force motor 4 exerts a force against the clutch 5 in the opposite direction of the connection direction.

In step S124, the actual (detected) steering angle is set as the command steering angle and the steering motor 6 is driven based on the command steering angle. Control then proceeds to step S125.

When the steering motor 6 is driven using the actual (detected) steering angle as the command steering angle, it exerts a drive torque in the opposite direction as the connection direction and, thus, the connection of the clutch 5 can be released.

In step S125, the signals used to determine if the clutch is released are acquired and a calculation is executed. More specifically, the reaction force motor actual current value Ih and the torque sensor value Th are acquired and the reaction force motor actual current value Ih is multiplied by the torque constant τh of the reaction force motor 4 to calculate the drive torque Mh of the reaction force motor 4. Control then proceeds to step S126.

In step S126, the difference Δh between the torque sensor value Th and the drive torque Mh of the reaction force motor 4 is calculated. Control then proceeds to step S127.

In step S127, the absolute value of the difference Δh is compared to a third threshold value ω3 and the sign of the torque sensor value Th is compared to the sign of the drive torque Mh of the reaction force motor 4. If the difference Δh is equal to or smaller than the third threshold value ω3 and the signs of the torque sensor value Th and the drive torque Mh are the same, the result of step S127 is Yes and control proceeds to step S128. Otherwise, the result of step S127 is No and the control returns.

In this variation, the third threshold value ω3 of the difference Δh is for determining if the clutch 5 has been released from a connected state. Therefore, the threshold value ω3 is smaller than the first threshold value ω1 and second threshold value ω2 for determining if the clutch 5 is connected. The third threshold value ω3 is set a value that is determined, for example, experimentally by measuring the difference between the drive torque of the reaction force motor 4 and the torque sensor value under conditions in which the clutch 5 is disconnected and the driver is steering at such a speed that steering is possible.

In step S128, the clutch connection confirmation flag is cleared and SBW control is executed with the variable gear ratio set to 1:1. Control returns.

The operational actions of the variations will now be explained.

First the action of releasing the connection of the clutch 5 in the first variation will be explained. As shown in the flowchart of FIG. 9, the processing proceeds from step S111 to step S112 if the clutch connection confirmation flag has been raised by the clutch connection determining processing. In step S112, the steering motor 6 is driven using the actual (detected) steering angle as the command steering angle. As a result, the steering motor 6 exerts a drive torque against the clutch 5 in the opposite direction as the connection direction and thereby releases the connected state of the clutch 5.

In step S113 the steering angular velocity θt' is calculated and in step S114 the current and previous values of the steering angular velocity θt' are compared to determine if the signs thereof are different (opposite). If the sign of the steering angular velocity θt' has reversed (from positive to negative or from negative to positive), it is determined that a torque oriented in the opposite direction has been exerted by the steering motor 6 and control proceeds to step S115. In step S115, clutch connection confirmation flag is cleared and SBW control is executed with the variable gear ratio set to 1:1.

Next, the action of releasing the connection of the clutch 5 in the second variation will be explained. If the clutch connection confirmation flag has been raised by the clutch connection determination processing, then control proceeds to step S122 where it is determined if the steering gear ratio is equal to or less than 1.

If the steering gear ratio is equal to or less than 1, then control proceeds to step S123. In step S123, the reaction force motor 4 exerts a torque oriented in the opposite direction of the connection direction and, thereby, releases the connection of the clutch 5.

Meanwhile, if the steering gear ratio is larger than 1, then control proceeds to step S124. In step S124, the steering motor 6 is operated using the actual (detected) steering angle as the command steering angle. As a result, the steering motor 6 exerts a drive torque in the opposite direction as the connection direction and, thereby, releases the connected state of the clutch 5. In step S125, the reaction force motor actual current value Ih and the torque sensor value Th are acquired and the drive torque Mh of the reaction force motor 4 is calculated. Then, in step S126 the difference Δh between the torque sensor value Th and the reaction force motor drive torque Mh is calculated, and in step S127 it is determined if the absolute value of the difference Δh is equal or less than ω3 and the signs of the torque sensor value Th and the drive torque Mh are the same. If the result of step S127 is affirmative, it is determined that a torque oriented in the opposite direction of the connection direction has been exerted by either the reaction force motor 4 or the steering motor 6 and control proceeds to step S128. In step S128, the clutch connection confirmation flag is cleared and SBW control is executed with the variable gear ratio set to 1:1.

The reason the torque oriented in the opposite direction as the connection direction is delivered from the reaction force motor 4 when the steering gear ratio is equal to or smaller than 1 will now be explained.

When the steering gear ratio is 1 or below, the steering motor 6 is driven so as to return to an angle determined by the steering wheel operating angle, the actual (detected) steering angle, and the ratio of the command steering angle to the steering wheel operating angle at the time when the clutch 5 became connected. It is difficult for the driver to turn the steering wheel beyond that angle. In such a case, instead of employing the steering motor 6 to exert the torque oriented in the opposite direction as the connection direction, the reaction force motor 4 can be employed to exert the torque oriented in the opposite direction. During the SBW control, the command current value for the reaction force motor 4 is set such that the reaction force motor 4 exerts a torque in the opposite direction of the connection direction because the reaction force motor 4 is not executing angle control (i.e., control wherein the reaction force controller 11 calculates a command steering wheel operating angle and controls the reaction force motor 4 such that the actual operating angle tracks the command operating angle).

As described previously, the apparatus is provided with a clutch connection releasing device (FIGS. 9 and 10) configured to use the steering motor 6 or the reaction force motor 4 to exert a torque in the opposite direction of the connection direction of the clutch 5 when the clutch connection determiner has determined that the clutch 5 is in a connected state.

If, for example, the apparatus were configured such that when the clutch 5 is determined to be connected, the apparatus shifts immediately to an EPS control that employs the clutch 5 in a connected state, the advantage of the SBW control with variable gear ratio executed prior to the shift would be lost. Additionally, connection of the clutch often results from a clutch malfunction, such as the rollers starting to move.

This embodiment addresses these issues by using the steering motor 6 or the reaction force motor 4 to exert a torque in the opposite direction as the connection direction of the clutch 5 when it is determined that the clutch 5 is connected. As a result, when a connection of the clutch 5 resulting from a clutch malfunction is detected, the connection can be released immediately such that the SBW control can be continued (after the clutch 5 is released) and the merits of SBW control can be enjoyed to the maximum degree.

The clutch connection releasing device (FIG. 9) is configured to drive the steering motor 6 using the actual (detected) steering angle existing at the point in time when it was determined that the clutch 5 was in a connected state as the command steering angle (step S112). In order to release the clutch connection, it is necessary to exert a torque against the clutch 5 in the opposite direction as the connection direction of the clutch 5.

Since the steering motor 6 is driven using the actual (detected) steering angle existing at the point in time when it was determined that the clutch 5 was in a connected state as the command steering angle, the connected state of the clutch 5 can be released by exerting a torque against the clutch 5 in the opposite direction as the connection direction.

The clutch connection releasing device (FIG. 10) is configured to exert a torque in the opposite direction as the connection direction of the clutch 5 using the reaction force motor 4 (step S123) when a variable gear ratio control is being executed such that a gear ratio becomes equal to or smaller than a clutch connection gear ratio (gear ratio=1) at the point in time when it is determined that the clutch 5 is in a connected state (i.e., when result of step S122 is "Yes").

When, for example, the steering gear ratio is 1 or below, the steering motor 6 is driven so as to return the steering gear ratio to the value it had at the moment the clutch 5 became connected. Consequently, the steering motor 6 cannot be used to release the clutch 5.

In such a case, since the reaction force motor 4 exerts a torque in the opposite direction as the clutch connection direction when variable gear ratio control is being executed such that the gear ratio is equal to or smaller than 1, the connected state of the clutch 5 can be released by exerting a torque against the clutch 5 in the opposite direction as the connection direction.

The clutch connection releasing device (FIG. 10) is configured to determine that the connection of the clutch 5 has been released when the absolute value of the difference Δh between the drive torque Mh imparted to the reaction force motor 4 and the torque sensor value Th detected by the torque sensor 2 is equal to or less than a third threshold value ω3 and the direction of the reaction force motor drive torque Mh and the direction of the torque sensor value Th are the same (i.e., when result of step S127 is "Yes").

In order to release the clutch connection, it is necessary to exert a torque against the clutch 5 in the opposite direction as the connection direction of the clutch 5.

By determining that the connection of the clutch 5 has been released when the absolute value of the difference Δh is equal to or smaller than ω3 (|Δh|≦ω3) and the signs of Th and Mh are the same, the release of the clutch connection can be diagnosed in a short period of time based on the assumption that a torque is exerted in the opposite direction as the clutch connection direction when the reaction force motor 4 starts rotating in the opposite direction.

The effects of the previously described variations of the first embodiment will now be explained. The effects listed below are achieved.

(6) The vehicle steering control apparatus is provided with a clutch connection releasing device (FIGS. 9 and 10) configured to use the steering motor 6 or the reaction force motor 4 to exert a torque in the opposite direction as the connection direction of the clutch 5 when the clutch connection determiner determines that the clutch 5 is connected. As a result, when a connection of the clutch 5 caused by a clutch malfunction is detected, the connection can be released immediately such that the SBW control can be continued (after releasing the clutch 5) and the merits of the SBW control can be enjoyed to the maximum degree.

(7) The clutch connection releasing device (FIG. 9) is configured to drive the steering motor 6 using the actual (detected) steering angle existing at the point in time when it was determined that the clutch 5 was in a connected state as the command steering angle (step S112). As a result, a torque can be exerted against the clutch 5 in the opposite direction as the clutch connection direction such that the connection of the clutch 5 is released.

(8) The clutch connection releasing device (FIG. 10) is configured to exert a torque in the opposite direction as the connection direction of the clutch 5 using the reaction force motor 4 (step S123) in situations where a variable gear ratio control is being executed such that a gear ratio becomes equal to or smaller than a clutch connection gear ratio (gear ratio=1) at the point in time when it is determined that the clutch 5 is in a connected state (i.e., when result of step S122 is "Yes"). As a result, a torque can be exerted against the clutch 5 in the opposite direction as the clutch connection direction such that the connection of the clutch 5 is released.

(9) The clutch connection releasing device (FIG. 10) is configured to determine that the connection of the clutch 5 has been released when the absolute value of the difference Δh between the drive torque Mh imparted to the reaction force motor 4 and the torque sensor value Th detected by the torque sensor 2 is equal to or less than a third threshold value ω3 and the direction of the reaction force motor drive torque Mh and the direction of the torque sensor value Th are the same (i.e., when result of step S127 is "Yes"). As a result, the release of the connection of the clutch 5 can be diagnosed in a short period of time based on the assumption that a torque is exerted in the opposite direction as the clutch connection direction when the reaction force motor 4 starts rotating in the opposite direction.

Second Embodiment

Figure 11:
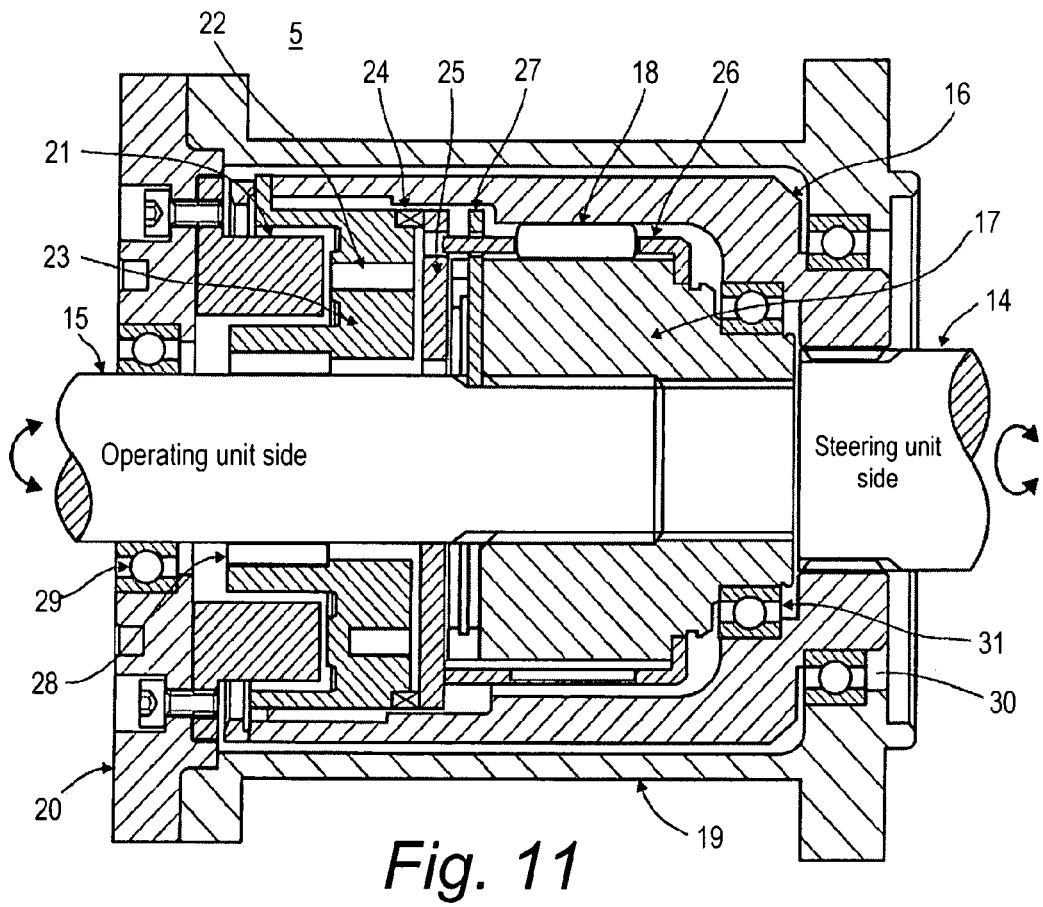
FIG. 11 is a cross sectional view of the clutch in a vehicle steering control apparatus in accordance with a second embodiment of the present invention.
Figure 12:
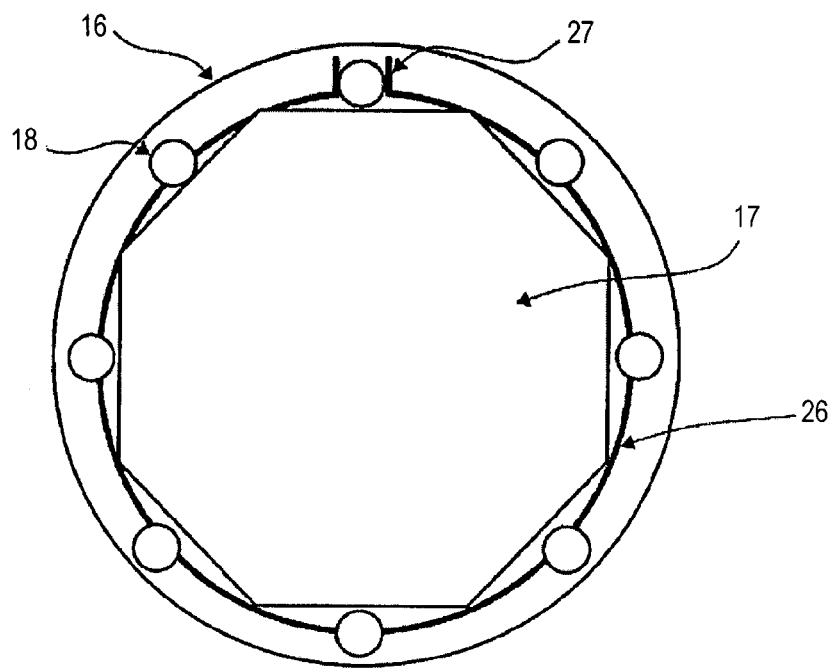
FIG. 12 is the mechanical clutch section of the clutch in a vehicle steering control apparatus in accordance with a second embodiment.

Referring now to FIGS. 11 and 12, a vehicle steering control apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 11 is a cross sectional view of a clutch of a vehicle steering control apparatus in accordance with the second embodiment. FIG. 12 shows the mechanical clutch section of the same clutch.

Referring back to FIG. 1, the SBW system constituting the vehicle steering control apparatus in accordance with the present invention is provided with the clutch 5 to serve as a backup mechanism. The clutch 5 is configured such that it can be connected and disconnected.

The clutch 5 includes an outer race 16, an inner race 17, an electromagnetic coil 21 and rotor 23 configured to generate a magnetic force, and a mechanical clutch section configured to mechanically connect and release the outer race 16 and inner race 17 to and from each other in accordance with the operating state of the electromagnetic coil 21 and the rotor 23. The mechanical clutch section comprises rollers 18, a holding device 26, and a neutral spring 27. The rollers 18, holding device 26, and the neutral spring 27 are provided on the inner race 17, which rotates together with the driver operating unit.

More specifically, the rollers 18, the holding device 26, and the neutral spring 27 are provided on whichever of the inner race 17 and the outer race 16 that has the smaller rotational speed. The inner race 17 is connected to a pulley shaft 15 of the backup mechanism that rotates together with the driver operating unit and, thus, the inner race 17 rotates together with the driver operating unit. The outer race 16 is connected to a pinion shaft 14 of the steering unit and rotates together with the pinion shaft 14.

The inner race 17 is attached to the pulley shaft 15 with a serrated connection. The outer race 16 is attached to the pinion shaft 14 of the steering unit with a serrated connection.

As shown in FIG. 12, the internal surface of the outer race 16 is cylindrical in shape and the external surface of the inner race 17 is cam shaped (octagonal). The mechanical clutch unit has rollers 18 (engaging elements) disposed between the outer race 16 and the inner race 17.

The clutch 5 is configured to be released when an electric current is delivered to the electromagnetic coil 21. More specifically, when a current is fed to the electromagnetic coil 21, the magnetic force of the electromagnetic coil 21 counterbalances the magnetic force of some permanent magnets 22 and holds the rollers 18 at a neutral position. As a result, the outer race 16 and inner race 17 are allowed to rotate relative to each other and the steering unit is disengaged from the driver operating unit. Conversely, when the clutch 5 is to be connected, a current is not fed to the electromagnetic coil 21. The magnetic force of the permanent magnet 22 causes the rollers 18 not to be held in the neutral position and the rollers 18 become wedged between the outer race 16 and the inner race 17, thereby connecting the clutch 5.

As shown in FIG. 11, the electromagnetic coil 21 is fixed to an end plate 20 (clutch case member) of a clutch case 19. The rotor 23 is secured with a serrated connection to an end position of the outer race 16 and the permanent magnets 22 are arranged in the rotor 23 so as to be within the field of the electromagnetic coil 21.

By arranging the permanent magnets 22 within the field of the electromagnetic coil 21, the electromagnetic coil 21 can be used to generate a magnetic flux that is oriented in either the same direction or the opposite direction as the magnetic flux of the permanent magnets 22.

As shown in FIG. 11, the mechanical clutch section comprises an armature 35 arranged such that it can be moved axially with respect to the rotor 23 with a separating spring 24 disposed there-between, a plurality of (eight) rollers 18 that are arranged between the outer race 16 and the inner race 17 and serve as engaging elements, and a holding device 26 that has the rollers 18 installed into pockets thereof and serves to hold the rollers 18 such that the rollers 18 are spaced apart from each other at a prescribed equal spacing. The holding device 26 is supported on the inner race 17 in such a manner that it can move rotationally thereabout. As shown in FIG. 12, the neutral spring 27 of the clutch 5 serves to hold one of the rollers 18 in a neutral position when the clutch 5 is released. During the transitional period when the clutch 5 is shifting from a connected state to a released state, the neutral spring 27 exerts a return spring force serving to urge the wedged roller toward the neutral position. The neutral spring 27 is fixed to the inner race 17.

A needle bearing 28 is provided between the pulley shaft 15 (on which the inner race 17 is mounted with a serrated connection) and the rotor 23 (which is attached to an end of the outer race 16). As shown in FIG. 11, a first ball bearing 29 supports the pulley shaft 15 on the end plate 20. A second ball bearing 30 supports the outer race 16 on the clutch case 19. A third ball bearing 31 is deposed between the outer race 16 and the inner race 17.

The operational actions of the second embodiment will now be explained.

If the reaction force motor 4 of the SBW system fails, reaction force control is terminated and the clutch 5 is mechanically connected such that the rotation of the steering wheel 1 is transferred to the pinion shaft 14. Meanwhile, on the steering unit side, the steering motor 6 is controlled in the same manner as the steering wheel operation assistance control used in a typical electric power steering system.

Clutch connection action: When the clutch 5 is connected, an OFF command is issued with respect to the electromagnetic coil 21 and the magnetic force generated by electromagnetic coil 21 is turned off. As a result, the magnetic force of the permanent magnets 22 arranged in the rotor 23 is able to overcome the spring force of the separating spring 24 installed between the rotor 23 and the armature 25. Thus, the armature 25 is drawn to the rotor 23 and the rotor 23 and armature 27 rotate as an integral unit with a frictional force acting there-between. The holding device 26 rotates due to the rotation of the armature 25 and the rollers 18 rotate in opposition to the spring force of the neutral spring 27. The rollers 18 become wedged between the outer race 16 and the inner race 17 and torque is transmitted through the clutch 5.

Clutch release action: When the clutch 5 is released, an ON command is issued with respect to the electromagnetic coil 21 and the electromagnetic coil 21 generates a magnetic force that counterbalances the magnetic force of the permanent magnet 22. As a result, the spring force of the separating spring 24 installed in the armature 25 overcomes the magnetic force of the permanent magnets 22 and separates the rotor 23 and the armature 25 from each other. Meanwhile, since a neutral spring 27 configured to hold the rollers 18 in a neutral position is built into the section where the wedged connection occurs, when the friction force between the rotor 23 and the armature 25 disappears, the return spring force of the neutral spring 27 causes the rollers 18 to return to the neutral position such that the wedged connection created by the rollers 18 is disengaged, i.e., the clutch 5 is released.

Thus configured, the clutch 5 performs two functions that are required of a clutch in an SBW system. First it performs a failsafe function by connecting when the power supply turns off, and second it satisfies the need for a small, high-torque clutch that has little slop (play) when it is connected.

Figure 13:
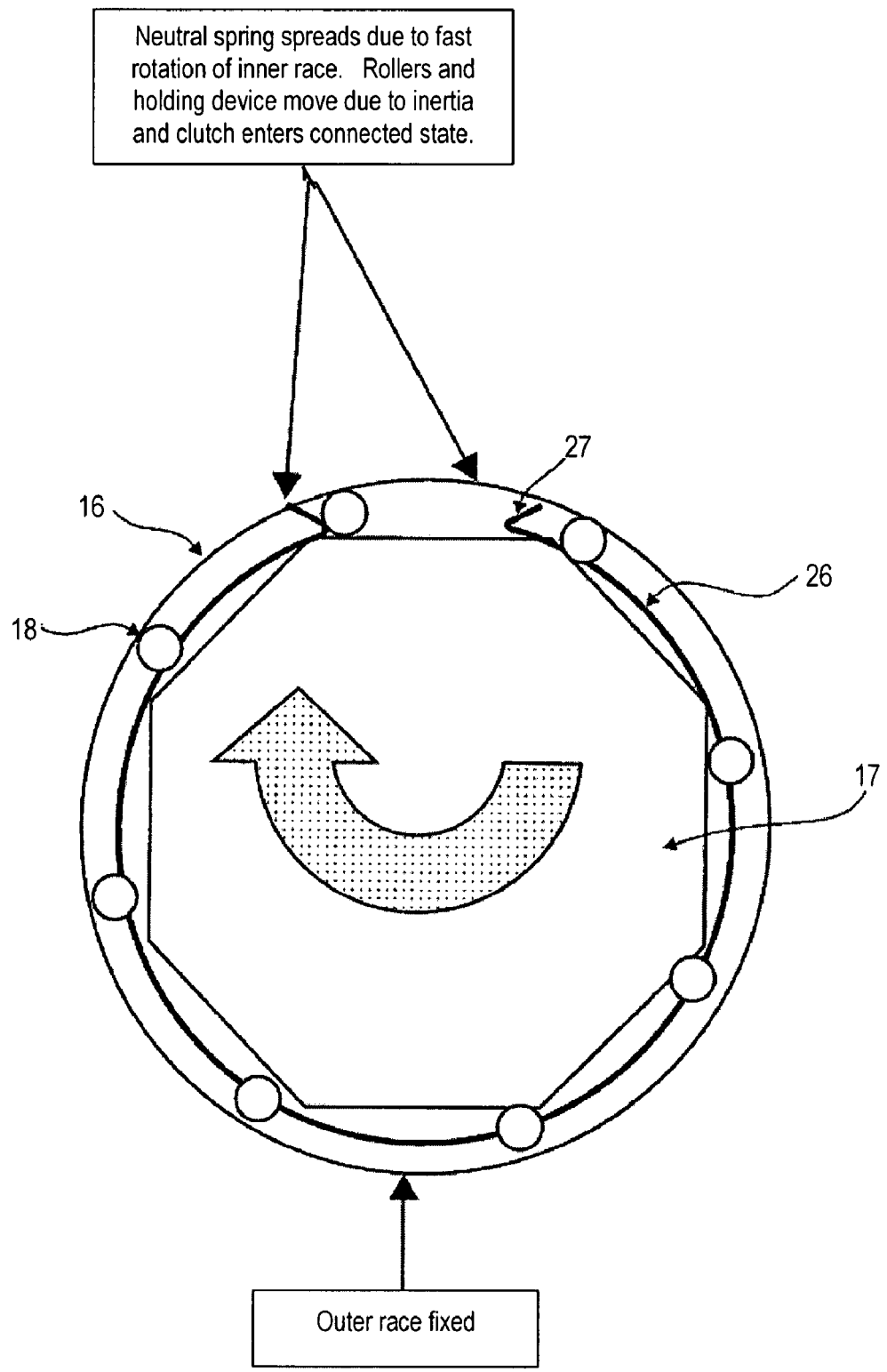
FIG. 13 illustrates how the clutch can become connected when it is supposed to be in a released state.

However, in a clutch 5 with a wedge-connection structure the armature, rollers, and holding device that rotate together with the inner race 17 have a certain degree of mass and, thus, an inertia torque is generated when the inner race 17 rotates while the clutch 5 is in a released state. The inner race is coupled to a rotary shaft such that the inner race rotates together with the steering unit, and the outer race is coupled to a rotary shaft such that the outer race rotates together with the driver operating unit. Consequently, during variable gear ratio control executed while the clutch is released, i.e., while the inner race and outer race are separated from each other, the rotational speed of the inner race is higher than the rotational speed of the outer race when the change of the steering angle is larger than the change of the operating angle. Consequently, the inertia torque is large and the neutral spring holding the rollers in the neutral position spreads such that the rollers and the holding device move from the neutral position to an engagement position, thereby resulting in wedge engagement (clutch connection). Connection of the clutch 5 when it is supposed to be in a released state depends on the inertia of the rollers 18, which are held by the neutral spring 27 while the clutch is in the released state. If a large inertia torque is generated in opposition to the spring force of the neutral spring 27 due to a large deceleration or acceleration of the rollers 18, the rollers 18 will move from the neutral position to the connection position and cause the clutch 5 to enter a connected state (see FIG. 13).

The constituent features of the system are the same as those of the first embodiment shown in FIGS. 1 to 3 and explanations thereof are omitted here for the sake of brevity.

Figure 14:
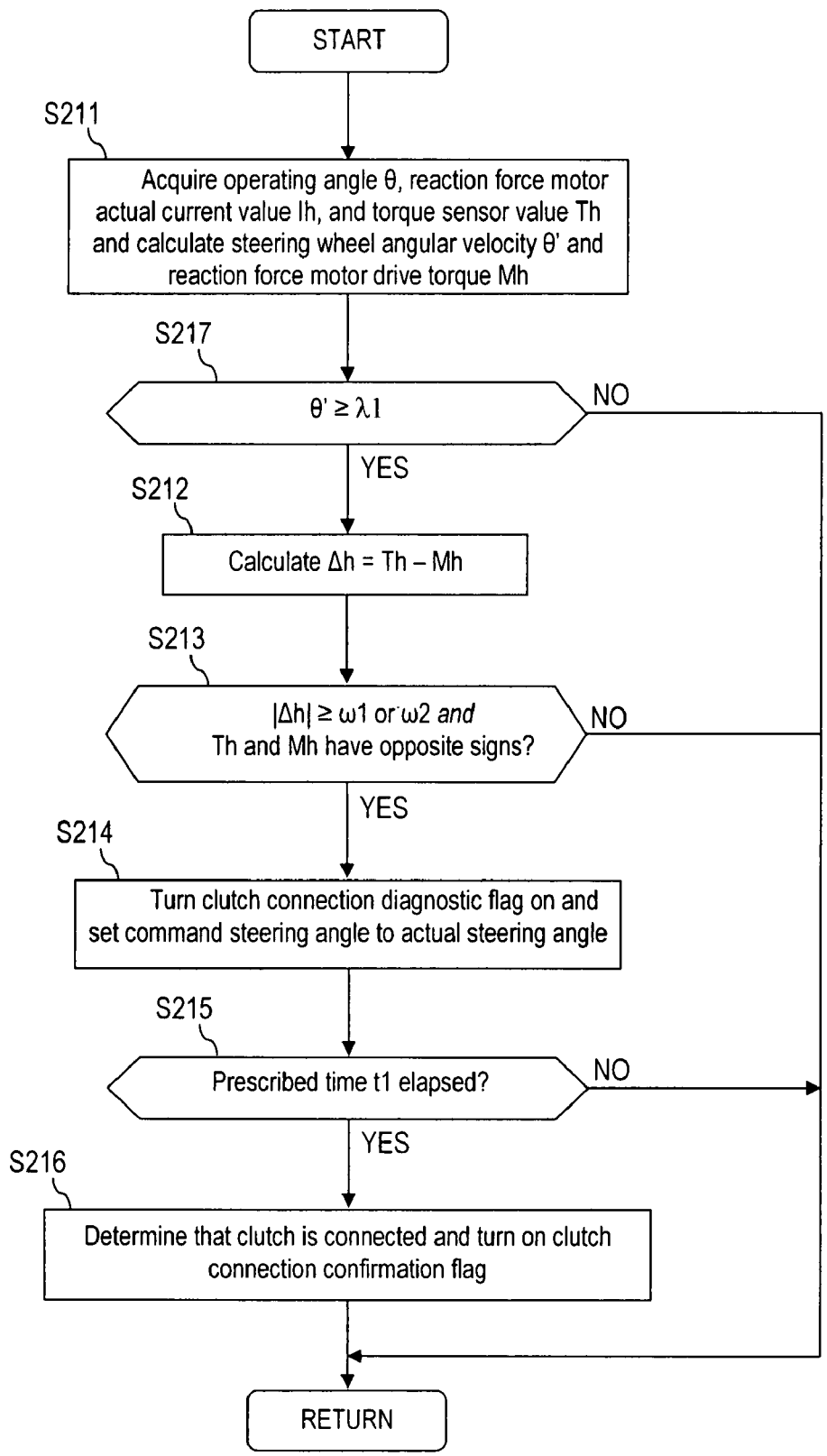
FIG. 14 is a flowchart of clutch connection determination processing executed by the operation reaction force controller and the steering controller of a first variation of the second embodiment of the present invention.

FIG. 14 is a flowchart showing the clutch connection determining processing executed by the reaction force controller 11 and the steering controller 12 in a first variation of the second embodiment. Each step of the flowchart will now be explained (this processing constitutes the clutch connection determiner). The processing steps S212 to S216 are the same as the processing steps S102 to S106 of the flowchart shown in FIG. 4. Therefore, explanations thereof are omitted here for the sake of brevity.

In step S211, the signals used to determine if the clutch is connected are acquired and a calculation is executed. More specifically, the steering wheel operating angle $\theta$, the reaction force motor actual current value Ih and the torque sensor value Th are acquired. Then, the operating angular velocity $\theta'$ of the steering wheel is calculated by executing computational processing contrived to differentiate the operating angle $\theta$ with respect to time, and the drive torque Mh of the reaction force motor 4 is calculated by multiplying the reaction force motor actual current value Ih by the torque constant $\tau$h of the reaction force motor 4. Control then proceeds to step S217.

In step S217 (clutch connection determination execution condition detector), a determination is made as to whether or not the steering wheel operating angular velocity $\theta'$ is equal to or larger than a first rate threshold value $\lambda 1$. If so (Yes), then control proceeds to step S212. If not (No), then control returns.

The first angular velocity threshold value $\lambda 1$ is a value corresponding to the operating angular speed that occurs when the steering wheel is turned abruptly (approximately 2 Hz).

Figure 15:
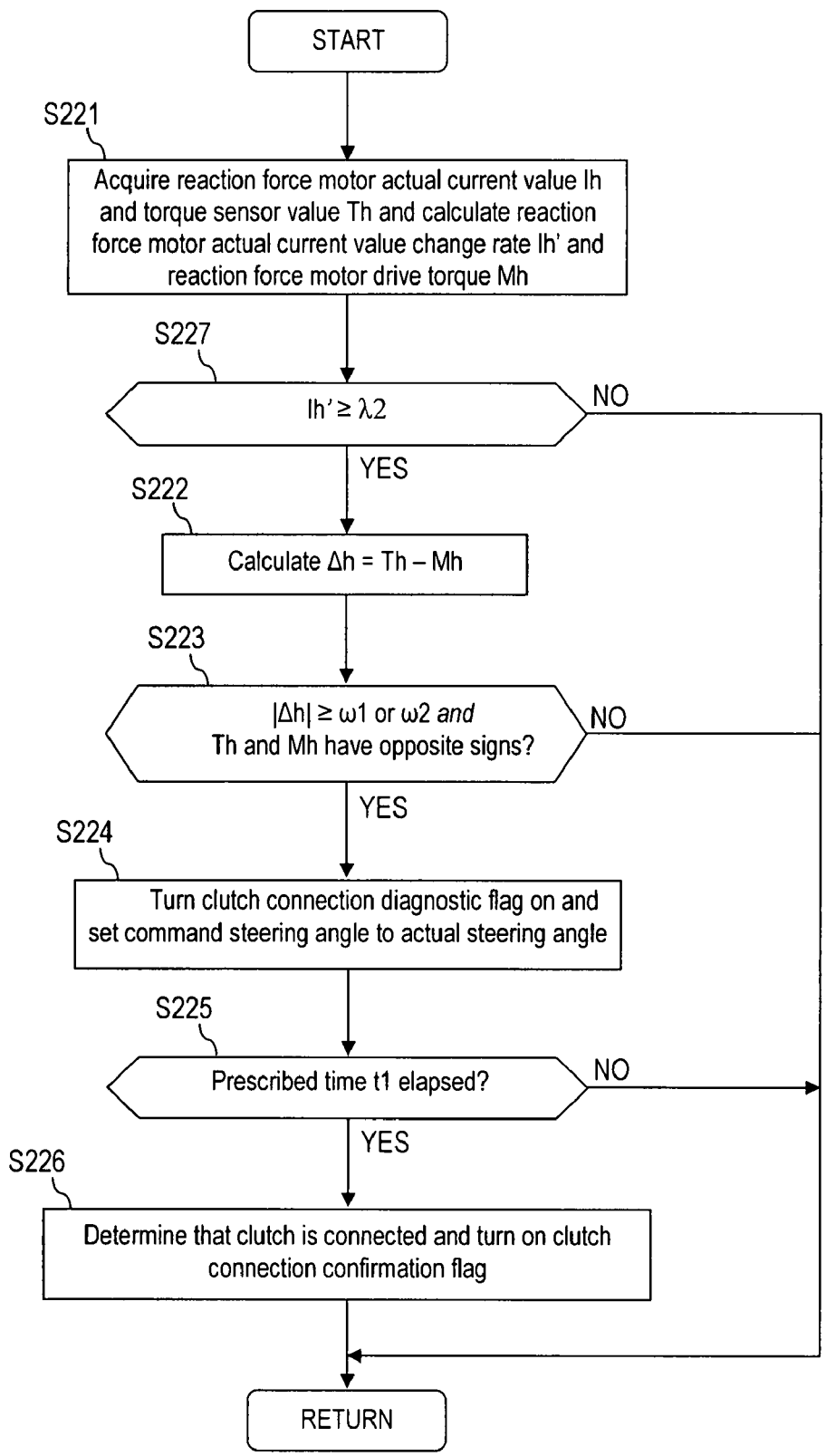
FIG. 15 is a flowchart of clutch connection determination processing executed by the operation reaction force controller and the steering controller of a second variation of the second embodiment of the present invention.

FIG. 15 is a flowchart showing the clutch connection determining processing executed by the reaction force controller 11 and the steering controller 12 in a second variation of the second embodiment. Each step of the flowchart will now be explained (this processing constitutes the clutch connection determiner). The processing steps S222 to S226 are the same as the processing steps S102 to S106 of the flowchart shown in FIG. 4. Therefore, explanations thereof are omitted here for the sake of brevity.

In step S221, the signals used to determine if the clutch is connected are acquired and a calculation is executed. More specifically, the reaction force motor actual current value Ih and the torque sensor value Th are acquired. Then, the reaction force motor actual current value rate of change Ih' is calculated by executing computational processing contrived to differentiate the reaction force motor actual current value Ih with respect to time, and the drive torque Mh of the reaction force motor 4 is calculated by multiplying the reaction force motor actual current value Ih by the torque constant Th of the reaction force motor 4. Control then proceeds to step S227.

In step S227 (clutch connection determination execution condition detector), a determination is made as to whether or not the reaction force motor actual current value change rate Ih' is equal to or larger than a second rate threshold value $\lambda 2$. If so (Yes), then control proceeds to step S222. If not (No), then control returns.

The second rate threshold value λ2 is a value corresponding to the reaction force motor actual current value change rate that occurs when the steering wheel is turned abruptly (approximately 2 Hz).

Figure 16:
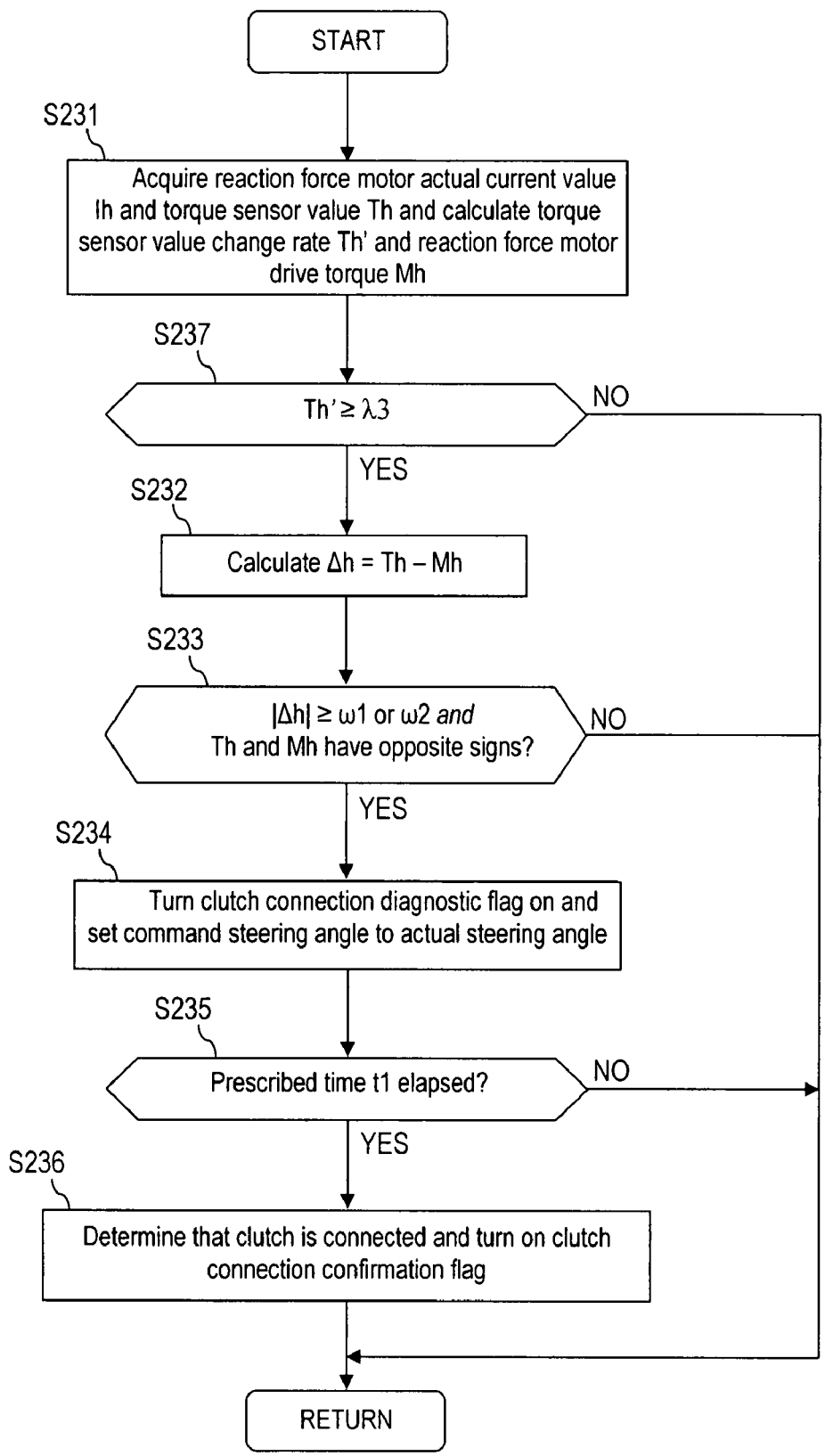
FIG. 16 is a flowchart of clutch connection determination processing executed by the operation reaction force controller and the steering controller of a third variation of the second embodiment of the present invention.

FIG. 16 is a flowchart showing the clutch connection determining processing executed by the reaction force controller 11 and the steering controller 12 in a third variation of the second embodiment. Each step of the flowchart will now be explained (this processing constitutes the clutch connection determiner). The processing steps S232 to S236 are the same as the processing steps S102 to S106 of the flowchart shown in FIG. 4. Therefore, explanations thereof are omitted here for the sake of brevity.

In step S231, the signals used to determine if the clutch is connected are acquired and a calculation is executed. More specifically, the reaction force motor actual current value Ih and the torque sensor value Th are acquired. Then, the torque sensor value change rate Th' is calculated by executing computational processing contrived to differentiate the torque sensor value Th with respect to time, and the drive torque Mh of the reaction force motor 4 is calculated by multiplying the reaction force motor actual current value Ih by the torque constant τh of the reaction force motor 4. Control then proceeds to step S237.

In step S237 (clutch connection determination execution condition detector), a determination is made as to whether or not the torque sensor value change rate Th' is equal to or larger than a third rate threshold value λ3. If so (Yes) proceeds to step S232. If not (No), then control returns.

The third rate threshold value λ3 is a value corresponding to the torque sensor value change rate that occurs when the steering wheel is turned abruptly (approximately 2 Hz).

The drive torque Mh of the reaction force motor 4 is employed in this embodiment of the present invention. However, it will be apparent to those skilled in the art from this disclosure that the drive command values calculated by the reactive force controller 11 can also be employed to carry out the present invention.

The operational actions of the variations of the second embodiment will now be explained.

In the first variation of the second embodiment, control proceeds from step S211 to step S217 to step S212 of FIG. 14 if the operating angular velocity θ' is equal to or larger than the first rate threshold value λ1.

In the second variation of the second embodiment, control proceeds from step S221 to step S227 to step S222 of FIG. 15 if the reaction force motor actual current value change rate Ih' is equal to or larger than the second rate threshold value λ2.

In the third variation of the second embodiment, control proceeds from step S231 to step S237 to step S232 of FIG. 16 if the torque sensor value change rate Th' is equal to or larger than the third rate threshold value λ3.

These connection diagnoses are executed when the measured operating angular velocity θ', reaction force motor actual current value change rate Ih', or torque sensor value change rate Th' is at a value that indicates an abrupt operation of the steering wheel (at approximately 2 Hz or higher) because the chances of the clutch 5 entering a connected state are high when the steering wheel is operated abruptly.

As described previously, a vehicle steering control apparatus in accordance with the second embodiment is provided with a clutch connection determination execution condition detector configured to detect if a condition exists which makes it necessary to detect if the clutch 5 is connected. The clutch connection determiner (FIGS. 14 to 16) executes a determination as to whether or not the clutch 5 is connected when a condition is detected which makes it necessary to detect if the clutch 5 is connected.

In other words, since a clutch connection determination is not executed when it is unnecessary to determine if the clutch 5 is connected, the apparatus can be prevented from incorrectly diagnosing that the clutch 5 is connected when conditions are such that it is unnecessary to determine if the clutch 5 is connected.

In a vehicle steering control apparatus in accordance with the second embodiment, the clutch connection determination execution condition detector (step S217) is configured to detect that a condition exists which requires determining if the clutch 5 is connected when the operating speed of the steering wheel 1, i.e., the operating angular velocity θ', is equal to or larger than a first rate threshold value λ1.

In the first variation of the second embodiment, the clutch connection determiner determines if the clutch 5 is connected when the operating angular velocity θ' is equal to-or higher than the first rate threshold value λ1. As a result, the connection diagnosis can be limited such that it is executed only when the operating speed of the driver operating unit is high, which is a condition in which the connection diagnosis is necessary.

In a vehicle steering control apparatus in accordance with the second embodiment, the clutch connection determination execution condition detector (step S227) is configured to detect that a condition exists which requires determining if the clutch 5 is connected when the rate of change of the drive torque of the reaction force motor 4, i.e., the reaction force motor actual current value change rate Ih', is equal to or larger than a second rate threshold value λ2.

One example of a situation in which connection of the clutch 5 could occur is when the operating direction of the steering wheel 1 is reversed with a certain degree of speed. When the steering wheel is reversed, the current value of the reaction force motor changes abruptly.

In the second variation of the second embodiment, the clutch connection determiner determines if the clutch 5 is connected when the reaction force motor actual current value change rate Ih' is equal to or larger than the second rate threshold value λ2. As a result, the connection diagnosis can be limited such that it is executed only when the reaction force motor actual current value Ih changes due to the steering wheel being reversed, which is a condition in which the connection diagnosis is necessary.

In a vehicle steering control apparatus in accordance with the second embodiment, the clutch connection determination execution condition detector (step S237) is configured to detect that a condition exists which requires determining if the clutch 5 is connected when the rate of change of the torque sensor value Th from the torque sensor 2, i.e., the torque sensor value change rate Th', is equal to or larger than a third rate threshold value λ3.

One example of a situation in which connection of the clutch 5 could occur is when the operating direction of the steering wheel 1 is reversed with a certain degree of speed. When the steering wheel is reversed, the sign of the torque sensor value (which is the detected value of the operating torque) is reversed.

In the third variation of the second embodiment, the clutch connection determiner determines if the clutch 5 is connected when the torque sensor value change rate Th' is equal to or larger than the third rate threshold value λ3. As a result, the connection diagnosis can be limited such that it is executed only when the torque sensor value Th changes due to the steering wheel being reversed, which is a condition in which the connection diagnosis is necessary.

The effects of the second embodiment will now be explained.

In addition to the effects (1) to (5) obtained with the first embodiment, a vehicle steering control apparatus in accordance with the second embodiment achieves the effects listed below.

(10) A vehicle steering control apparatus in accordance with the second embodiment is provided with a clutch connection determination execution condition detector configured to detect if a condition exists which makes it necessary to detect if the clutch 5 is connected. The clutch connection determiner (FIG. 14, FIG. 15, FIG. 16) executes a determination as to whether or not the clutch 5 is connected when a condition is detected which makes it necessary to detect if the clutch 5 is connected. As a result, the apparatus can be prevented from incorrectly diagnosing that the clutch 5 is connected when conditions are such that it is unnecessary to determine if the clutch 5 is connected.

(11) The clutch connection determination execution condition detector (step S217) is configured to detect that a condition exists which requires determining if the clutch 5 is connected when the operating speed of the steering wheel 1, i.e., the operating angular velocity $\theta'$, is equal to or larger than a first rate threshold value $\lambda 1$. As a result, the connection diagnosis can be limited such that it is executed only when the operating speed of the driver operating unit is high.

(12) The clutch connection determination execution condition detector (step S227) is configured to detect that a condition exists which requires determining if the clutch 5 is connected when the rate of change of the drive torque of the reaction force motor 4, i.e., the reaction force motor actual current value change rate $Ih'$, is equal to or larger than a second rate threshold value $\lambda 2$. As a result, the connection diagnosis can be limited such that it is executed only when the reaction force motor actual current value Ih changes due to the operating direction of the steering wheel being reversed.

(13) The clutch connection determination execution condition detector (step S237) is configured to detect that a condition exists which requires determining if the clutch 5 is connected when the rate of change of the torque sensor value Th from the torque sensor 2, i.e., the torque sensor value change rate $Th'$, is equal to or larger than a third rate threshold value $\lambda 3$. As a result, the connection diagnosis can be limited such that it is executed only when the torque sensor value Th changes due to the operating direction of the steering wheel being reversed.

In this patent specification, vehicle steering control apparatuses in accordance with the present invention are explained based on a first embodiment and a second embodiment. However, the specific constituent features of the invention are not limited to those of the embodiments. Various design modifications and additions can be made so long as they do not exceed the scope of the invention as described in the appended claims.

For example, in the first and second embodiments, a torque sensor 2 is used as the means of detecting the operating torque applied to the steering unit. However, the means of detecting the operating torque is not limited to a torque sensor 2. Any other means is also acceptable so long as it is capable of detecting the operating torque imparted to the driver operating unit and detecting if the direction of the operating torque has changed.

In the first embodiment, when the connection of the clutch 5 is released using the steering motor 6, the actual (detected) steering angle at that time is used as the command steering angle for driving the steering motor 6. However, instead of using the actual (detected) steering angle as the command steering angle, it is also acceptable to set the command current value of the steering motor 6 to a value that generates the maximum torque in the opposite direction. This method makes it possible to release the connection of the clutch 5 in a short amount of time.

In the first embodiment, the clutch connection determiner determines that the clutch is connected when three conditions are satisfied: a difference condition, a sign condition (direction condition), and a time condition. In the second embodiment, the clutch connection determiner determines that the clutch is connected when, in addition to the three conditions of the first embodiment, an additional requirement that a situation exist which makes it necessary to determine if the clutch is connected is satisfied. However, any clutch connection determiner can be included in the scope of the present invention so long as it determines that the clutch is in a connected state when the direction of the drive torque imparted to the steering reaction force actuator and the direction indicated by the operating torque detection value detected by the operating torque detector are different.

Although the first and second embodiments exemplify case in which the invention is applied to a steer-by-wire system provided with only a clutch as a backup mechanism, the present invention can also be applied to SBW systems having a clutch and a cable. In short, the present invention can be applied to any vehicle steering control apparatus in which an driver operating unit and a steering unit are separated by releasing a clutch and a steer-by-wire control is executed which is contrived to issue a control command that drives a steering actuator such that a steering angle corresponding to the operating state of the driver operating unit is achieved by the steering unit and a control command that drives a steering reaction force actuator such that an operation reaction force corresponding to the steering state of the steering unit is imparted to the driver operating unit.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle steering control apparatus comprising:
   a driver operating unit configured to be operated by a driver;
   a steering unit arranged to be mechanically separated from the driver operating unit and configured to turn at least one steered wheel;
   a steering reaction force actuator operable to apply an operating reaction force to the driver operating unit;
   a steering actuator configured to apply a turning force to the steering unit;
   a clutch operable to mechanically connect and disconnect the driver operating unit and the steering unit to and from each other;
   an operating torque detector operable to detect an operating torque applied to the driver operating unit; and
   a controller configured to
      determine a drive torque value based on a drive torque imparted to the steering reaction force actuator, and
      determine that the clutch is in a connected state when a drive torque direction indicated by the drive torque value and an operating torque direction indicated by an operating torque detection value detected by the operating torque detector are different.

2. The vehicle steering control apparatus as recited in claim 1, wherein
   the controller is further configured to calculate a difference between the drive torque value and the operating torque detection value detected by the operating torque detector, and to determine that the clutch is in a connected state when an absolute value of the difference calculated by the controller is equal to or larger than a threshold value.

3. The vehicle steering control apparatus as recited in claim 2, wherein
   the controller is further configured to set a first threshold value as the threshold value when the driver operating unit is operated in a direction so as to turn wider or to return toward a non-turning position, and a second threshold value as the threshold value when the driver operating unit is operated such that the operating torque direction is changed, with the second threshold value being larger than the first threshold value.

4. The vehicle steering control apparatus as recited in claim 2 or 3, wherein
   the controller is further configured to raise a clutch connection diagnostic flag and set a command steering angle to a detected steering angle upon determining that the clutch is in the connected state.

5. The vehicle steering control apparatus as recited in claim 4, wherein
   the controller is further configured to determine that the clutch is in the connected state and raise a clutch connection confirmation flag when the clutch connection diagnostic flag has been in a raised state continuously for at least a prescribed amount of time.

6. The vehicle steering control apparatus recited in claim 1, wherein
   the controller is further configured to detect a prescribed condition in which the controller determines if the clutch is in the connected state; and
   the controller is further configured to execute determination of whether the clutch is in the connected state when the prescribed condition has been detected.

7. The vehicle steering control apparatus as recited in claim 6, wherein
   the controller is further configured to detect that the prescribed condition exists when an operating speed of the driver operating unit is equal to or larger than a first rate threshold value.

8. The vehicle steering control apparatus as recited in claim 6, wherein
   the controller is further configured to detect that the prescribed condition exists when a change rate of the drive torque value is equal to or larger than a second rate threshold value.

9. The vehicle steering control apparatus as recited in claim 6, wherein
   the controller is further configured to detect that the prescribed condition exists when a change rate of the operating torque detection value detected by the operating torque detector is equal to or larger than a third rate threshold value.

10. The vehicle steering control apparatus recited in claim 1, wherein
    the controller is further configured to exert a torque in an opposite direction of a connection direction of the clutch using the steering actuator or the steering reaction force actuator when the controller detects that the clutch is in the connected state.

11. The vehicle steering control apparatus as recited in claim 10, wherein
    the controller is further configured to drive the steering actuator using a detected steering angle existing at a point in time when the controller detected the connected state of the clutch as a command steering angle.

12. The vehicle steering control apparatus as recited in claim 10, wherein
    the controller is further configured to exert a torque in an opposite direction of a connection direction of the clutch using the steering reaction force actuator when a variable gear ratio control is being executed such that a gear ratio becomes equal to or smaller than a clutch connection gear ratio at a point in time when the controller detected the connected state of the clutch.

13. The vehicle steering control apparatus recited in claim 10, wherein
the controller is further configured to determine that the clutch has been disconnected when the absolute value of the difference between the drive torque value and the operating torque detection value detected by the operating torque detector is equal to or below a third threshold value and the direction of the drive torque value and the operating torque direction of the operating torque detection value detected by the operating torque detector are equal.

14. A vehicle steering control method comprising:
providing a driver operating unit configured to be operated by a driver to input an operating torque to a steering unit that is configured to turn at least one steered wheel, with a steering actuator configured to apply a turning force to the steering unit based on the operating torque and a clutch selectively operable to mechanically connect and disconnect the driver operating unit and the steering unit to and from each other to selectively transmit the operating torque to the steering unit;

providing a steering reaction force actuator operable to apply an operating reaction force to the driver operating unit;

detecting a direction of a drive torque imparted to the steering reaction force actuator coupled to a driver operating unit;

detecting an operating torque direction of the operating torque applied by the driver to the driver operating unit; and determining that the clutch is in a connected state when the direction of the drive torque imparted to the steering reaction force actuator and the operating torque direction of the operating torque are different.

* * * * *